May 3, 1955
J. H. LESLIE II., ET AL
2,707,430
AUTOMATIC STRAPPING MACHINE
Filed Dec. 22, 1949
14 Sheets-Sheet 7
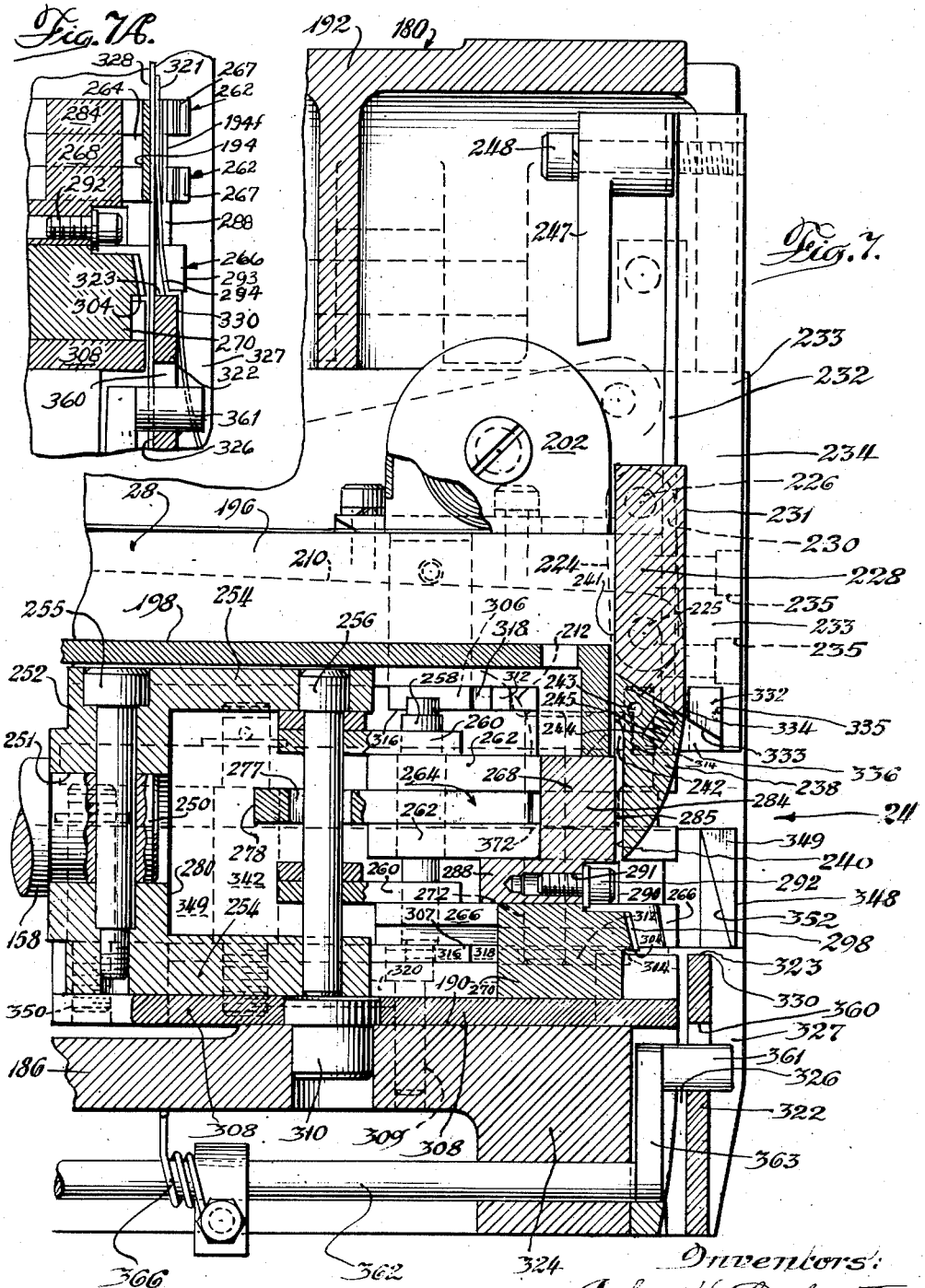

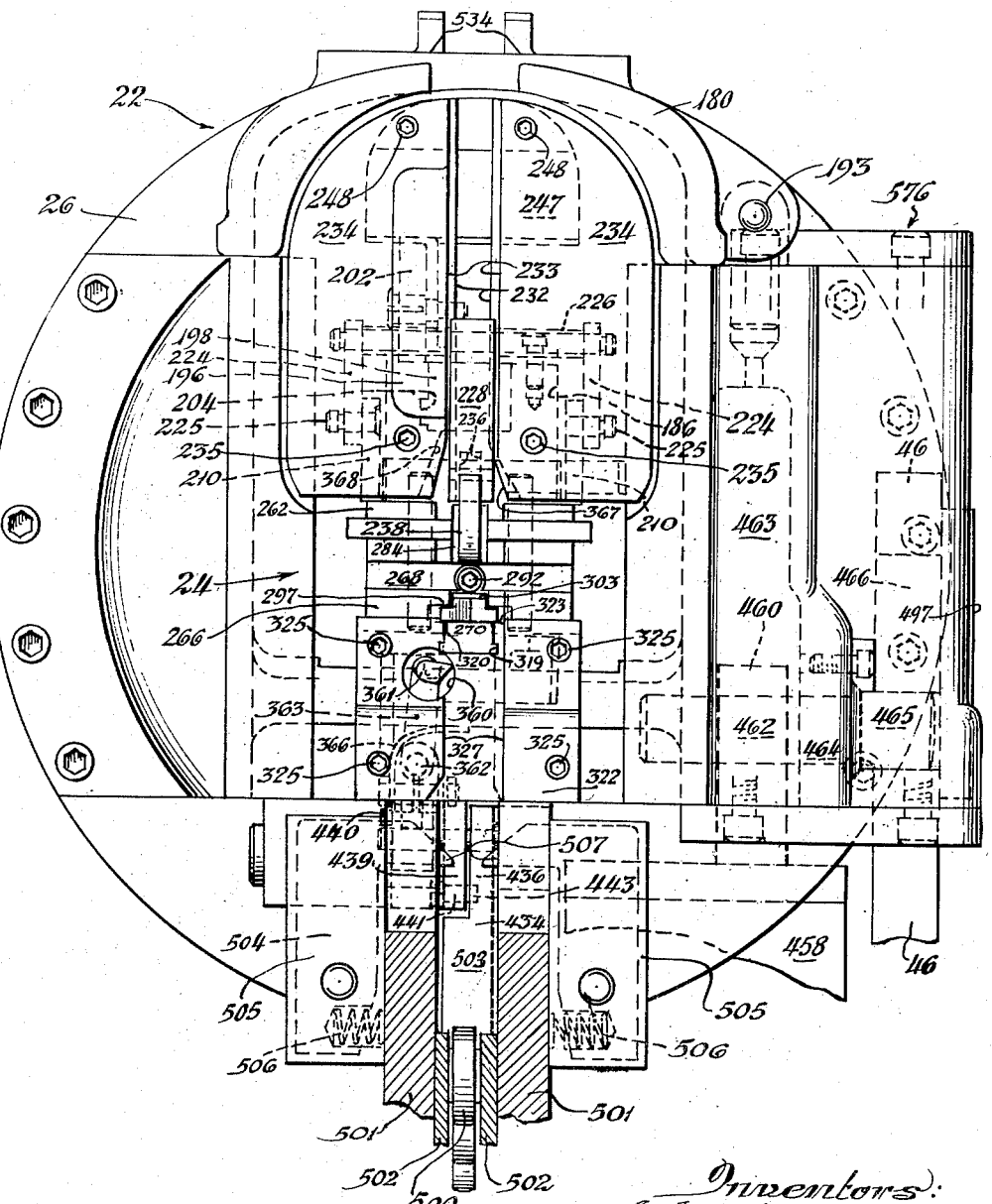

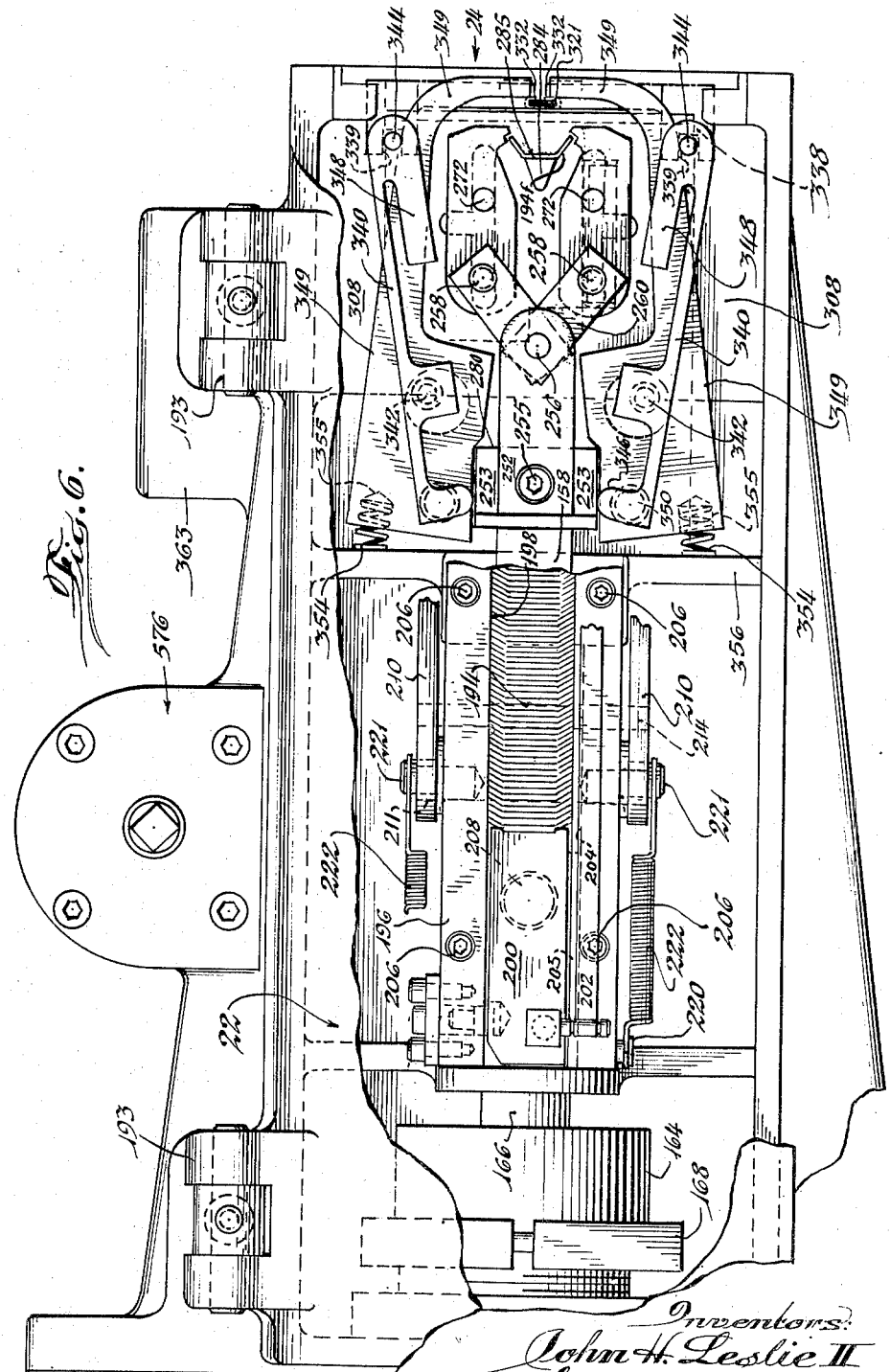

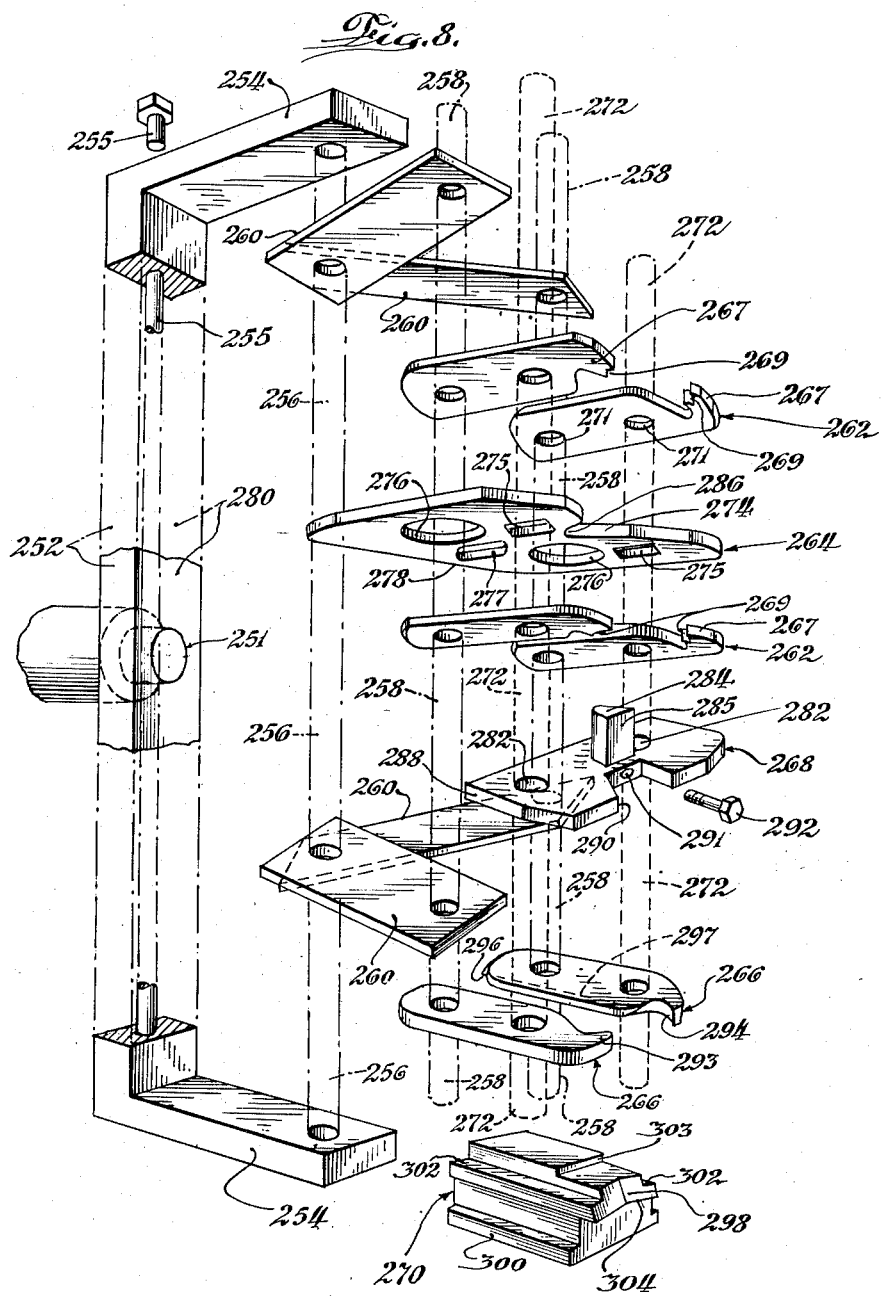

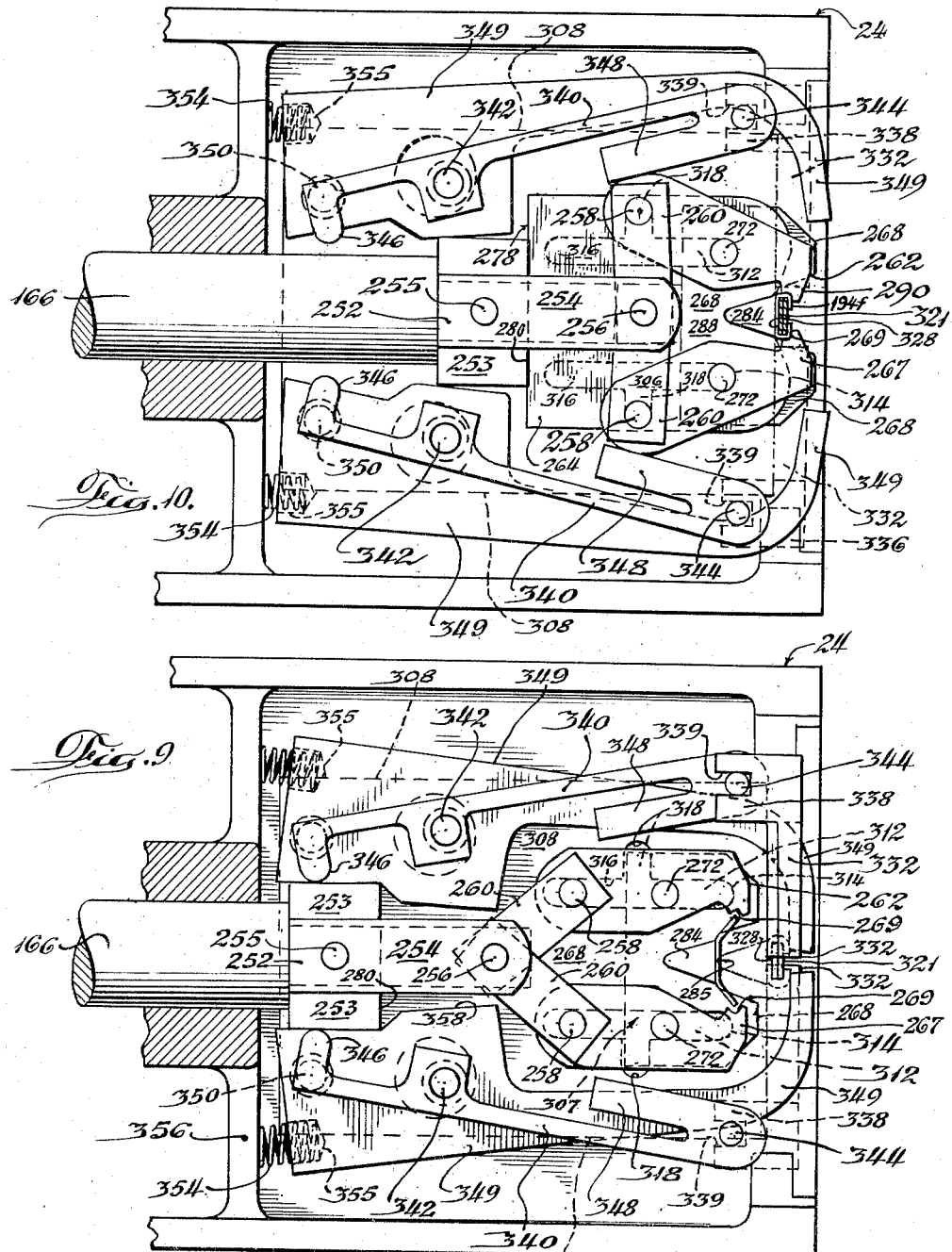

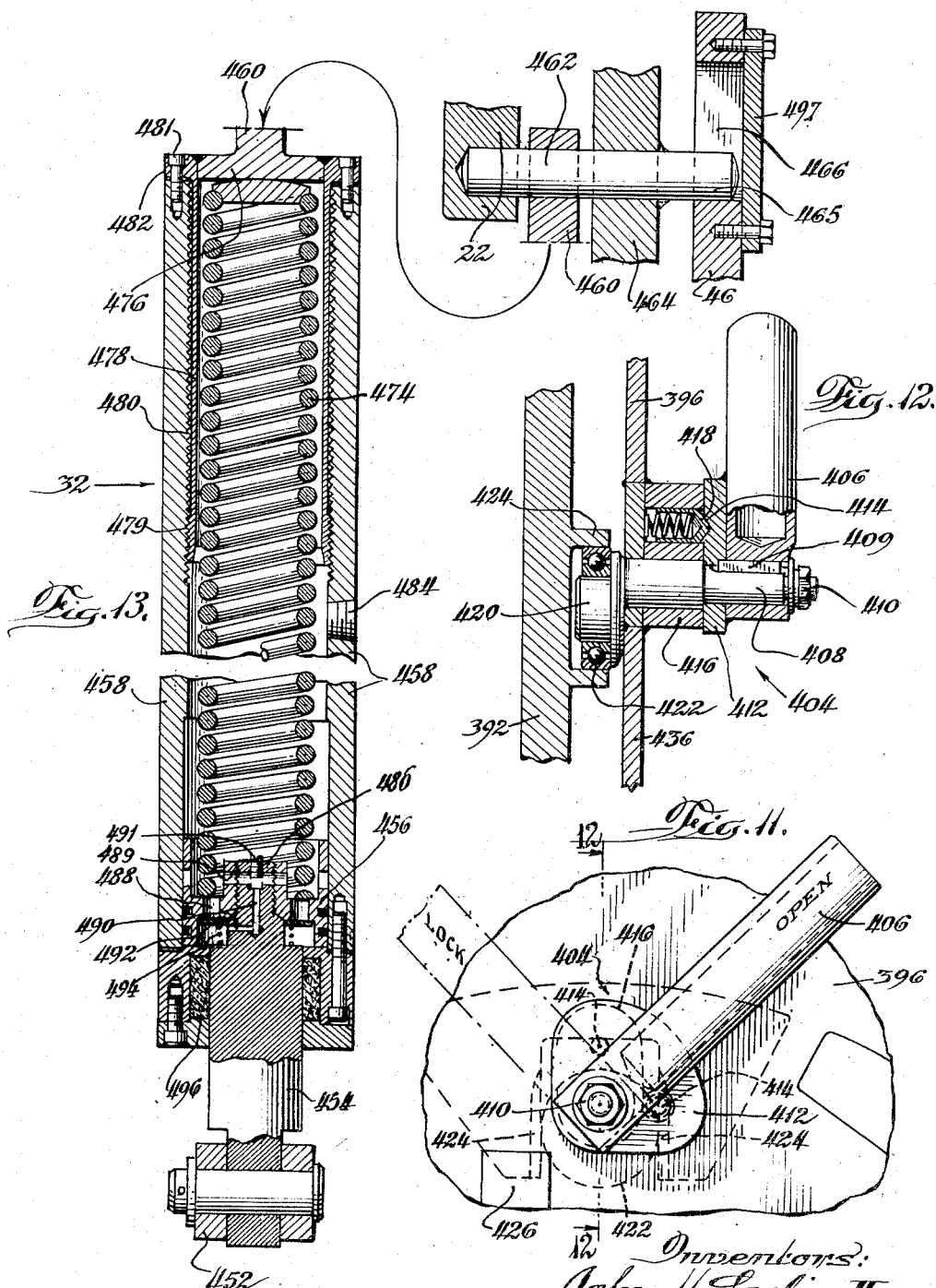

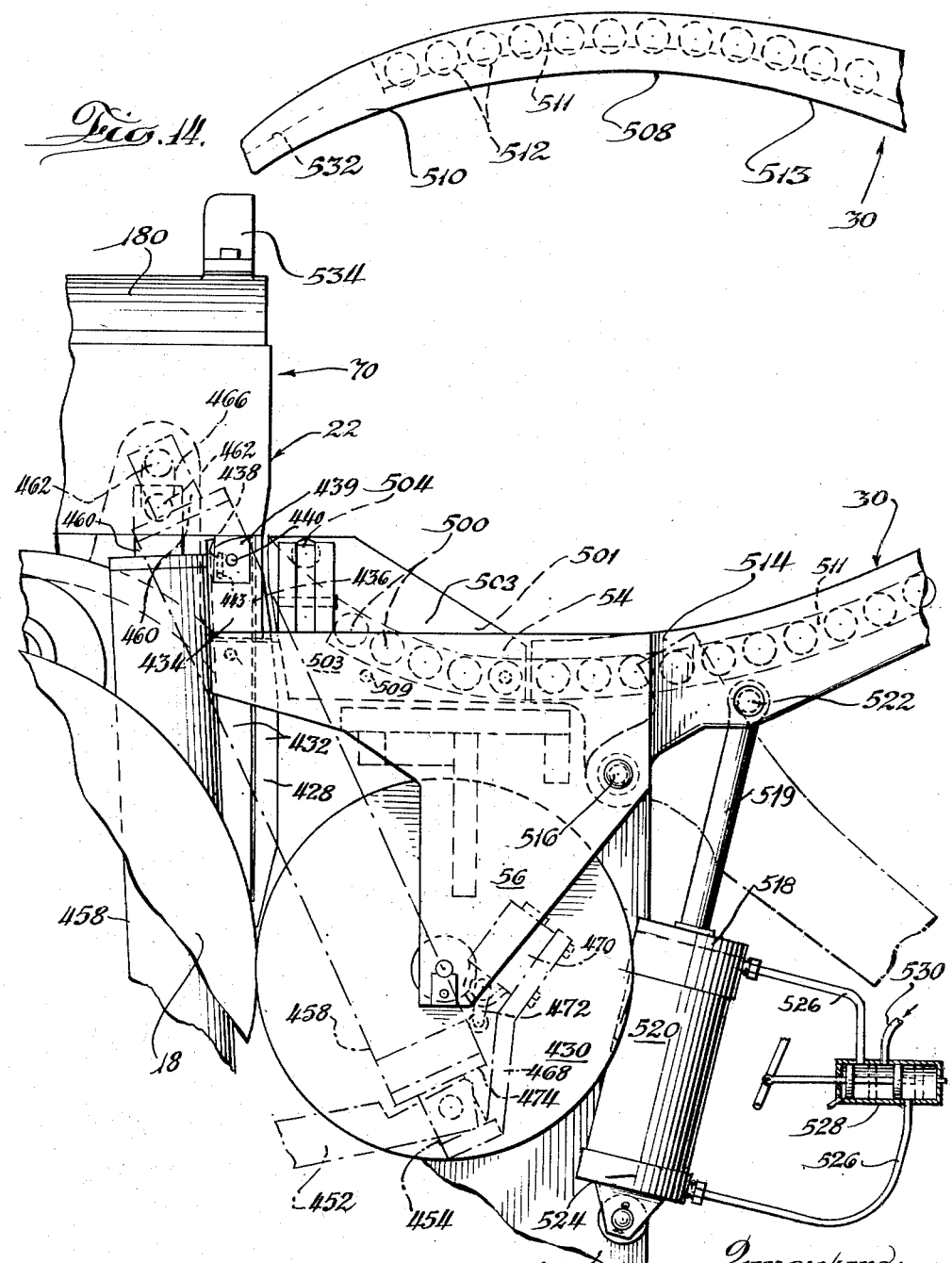

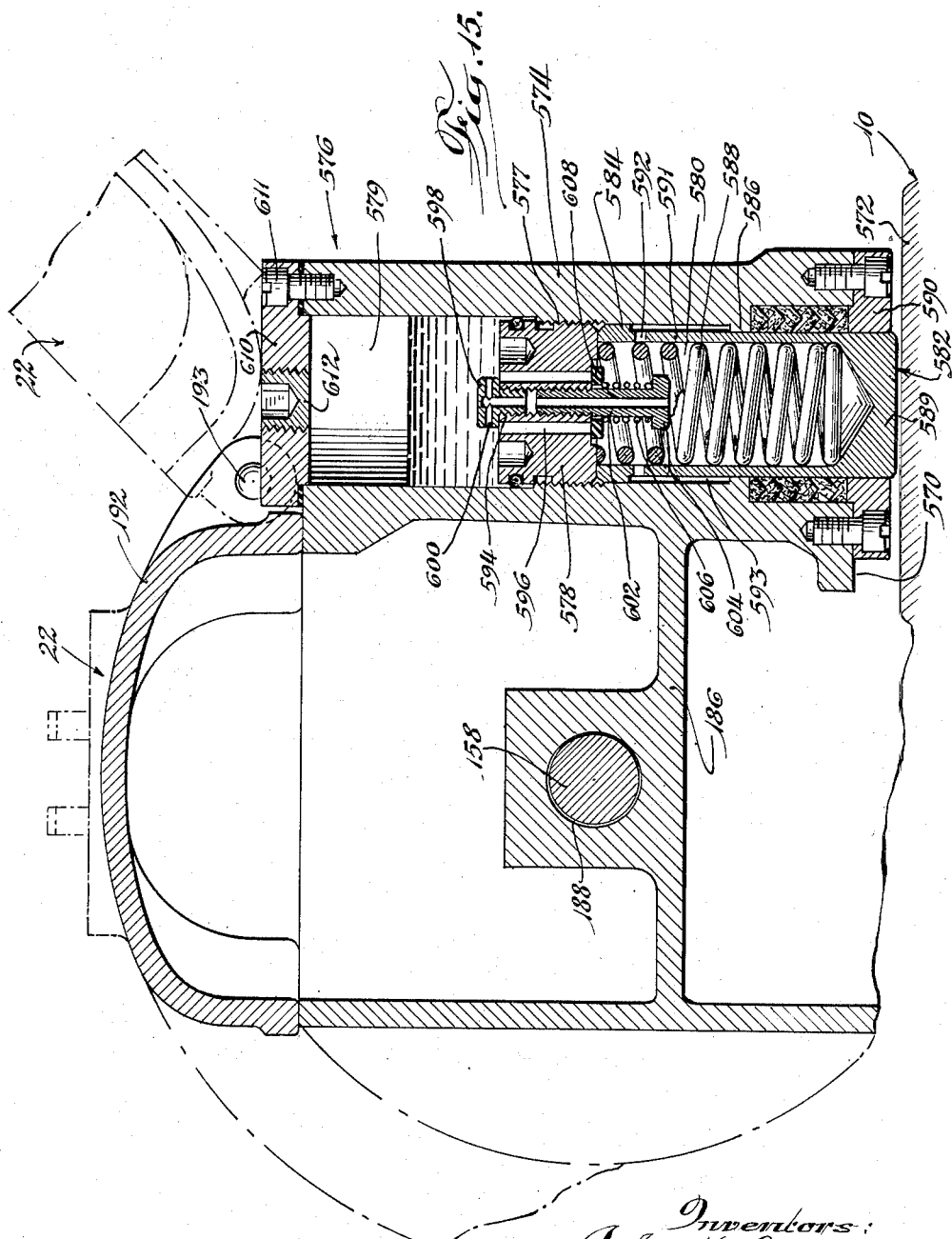

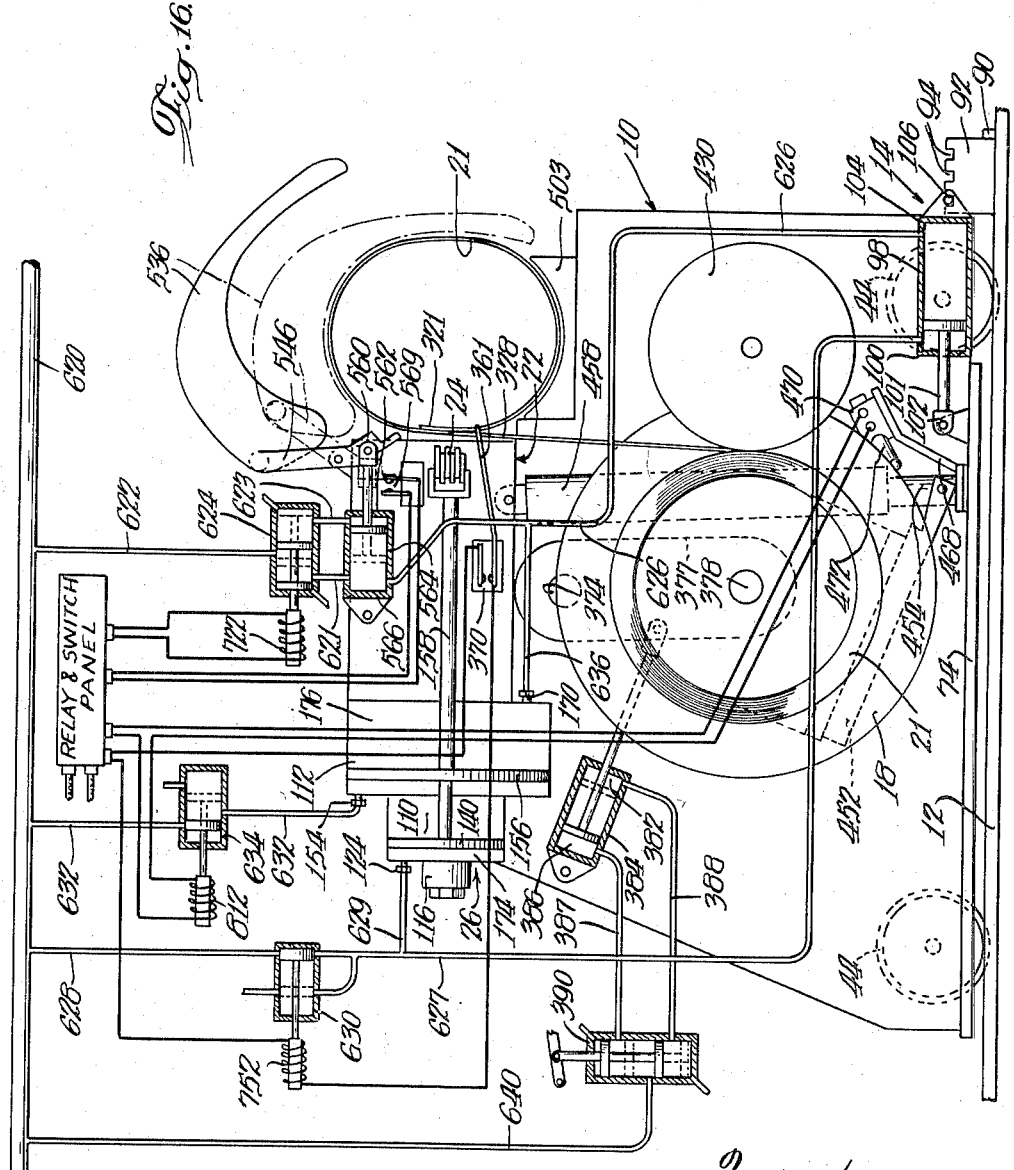

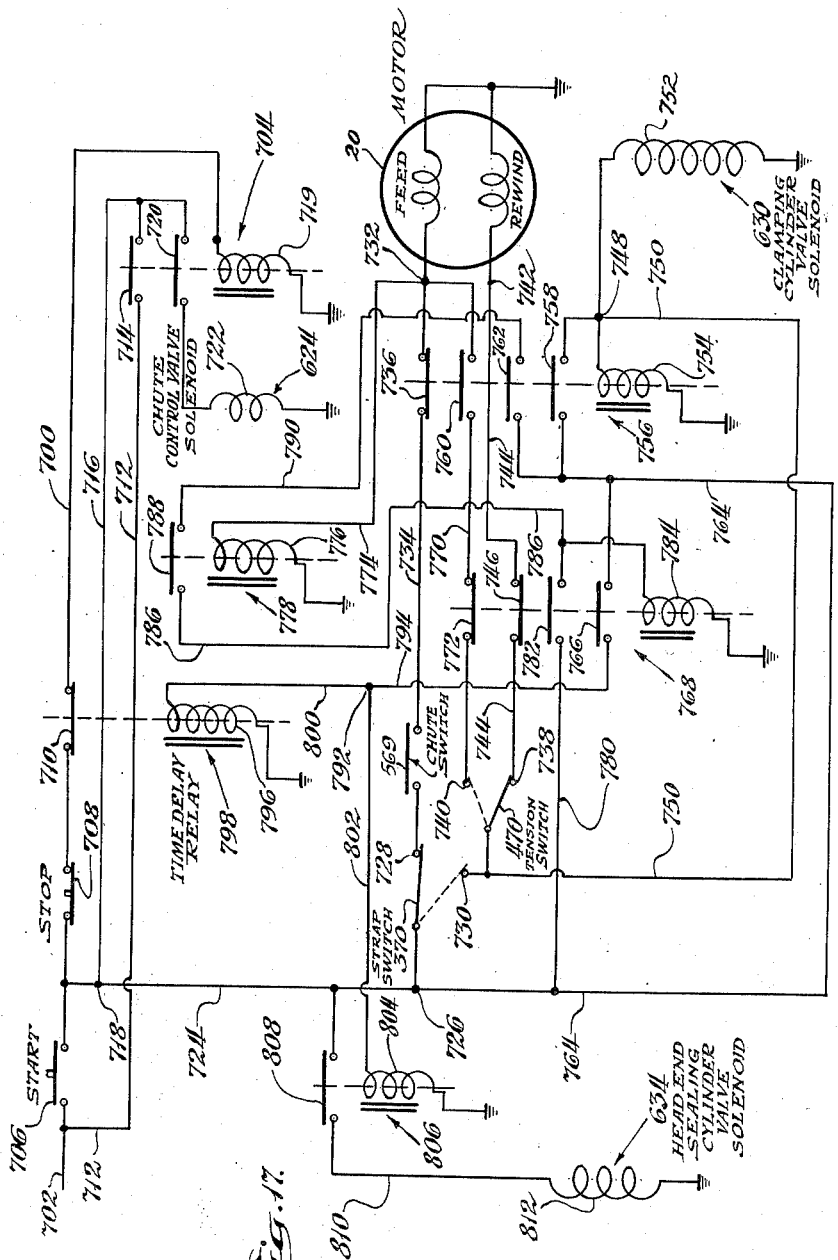

United States Patent Office 2,707,430
Patented May 3, 1955

2,707,430

AUTOMATIC STRAPPING MACHINE

John H. Leslie II, Evanston, and George A. Crosby, Park Ridge, Ill., assignors to Signode Steel Strapping Company, Chicago, Ill., a corporation of Delaware Application December 22, 1949, Serial No. 134,526

30 Claims. (Cl. 100—12)

The present invention relates to an automatic strapping machine. More particularly, the invention relates to a machine which, upon the initiation of its operation, automatically withdraws a length of bundle binding material, such as flexible steel strap, from a source of strap supply, such as a reel, passes it about a bundle with the free ends of the bundle encircling strap loop overlapping, draws the strap loop tightly about the bundle, forms a joint in the overlapping strap portions and severs the strap loop formed about the tightly bound bundle from the strap supply to release the bundle.

It is evident from the above characterization of the machine that it may be used in many situations where manual strapping it to be done and will perform that operation more quickly and more uniformly. It is particularly suited to conveyor line operations and possesses the additional advantage of being able to bind bundles in circumstances or environments wherein personnel cannot operate. In no place are the virtues of this machine more clearly evident than in the steel industry and the following advantages are set forth with particular reference to that industry.

The advantages of compactly and tightly binding such products as coils of strip steel or wire stock are, of course, that the coils will be prevented from unwinding with possible injury to personnel or the steel and substantial inconvenience in handling, and that in their bound compact form the steel is better protected, more economically stored, and more easily handled and shipped.

In the manipulation of such coils of strip steel or wire stock the machine embodying our invention is capable of binding such coils immediately as they leave hot forming operations.

Such a machine may band a bundle more quickly than hand manipulative processes and may secure a more even strap tension and these results can be attained while the material being bound is too hot to be closely approached.

It likewise will bind such materials as coils of spring steel and the like which cannot be satisfactorily bound by hand tools or previously known automatic machines.

A further advantage of such a machine is that a single operator may operate a battery of several of these machines to bind simultaneously at a number of separated points long bundles composed of such commodities as lengths of pipe or tubing.

Another advantage of particular significance in the bundling of coils or wire or reinforcing rod is that there is no limit to the takeup or retraction of strap necessary for proper tensioning.

Other characteristic advantages of a machine embodying our invention are that such a machine will bind a bundle or package of any size within the capacity of the machine without adjustment for varying sizes and will apply a tensional force to both ends of the strap surrounding a bundle so as to obtain more effective tensioning.

Other objects and advantages of our invention will be apparent from the following description of a preferred embodiment which is illustrated in the accompanying drawings, in which:

Fig. 5 is an enlarged elevation of the face of the head;

Fig. 6 is a section taken substantially on the line 6—6 of Fig. 4;

Fig. 7 is a vertical section of the joint forming jaw assembly which may be considered as an enlargement of the right-hand portion of Fig. 4 indicated by the arrows 7—7 thereof;

Fig. 7A is a section of a fragment of the joint-forming jaw assembly showing the manner in which the free end of the strap is anchored for tensioning of the strap;

Fig. 8 is an exploded view of the jaw assembly;

Figs. 9 and 10 are top plan views of the jaw assembly illustrating the position of the parts at the beginning and at the completion of a joint;

Fig. 11 is an elevation of a portion of the strap reel cover which includes the lock for retaining it in place;

Fig. 12 is a section taken substantially on the line 12—12 of Fig. 11;

Fig. 13 is a section through the tension controller or cylinder for distributing and controlling binder tension;

Fig. 14 is an elevation of the front portion of the machine taken from the left-hand side and illustrating an alternative form of the strap track or channel assembly;

Fig. 15 is a section through the sealer housing and shock absorber taken substantially on the line 15—15 of Fig. 4 showing, however, detailed structure only of the shock absorber;

Fig. 16 is a diagrammatic representation of the pneumatic system by which most of the machine's operations are performed; and Fig. 17 is a diagrammatic representation of the electrical system by which the machine's operations are controlled.

*General*

Figure 1:
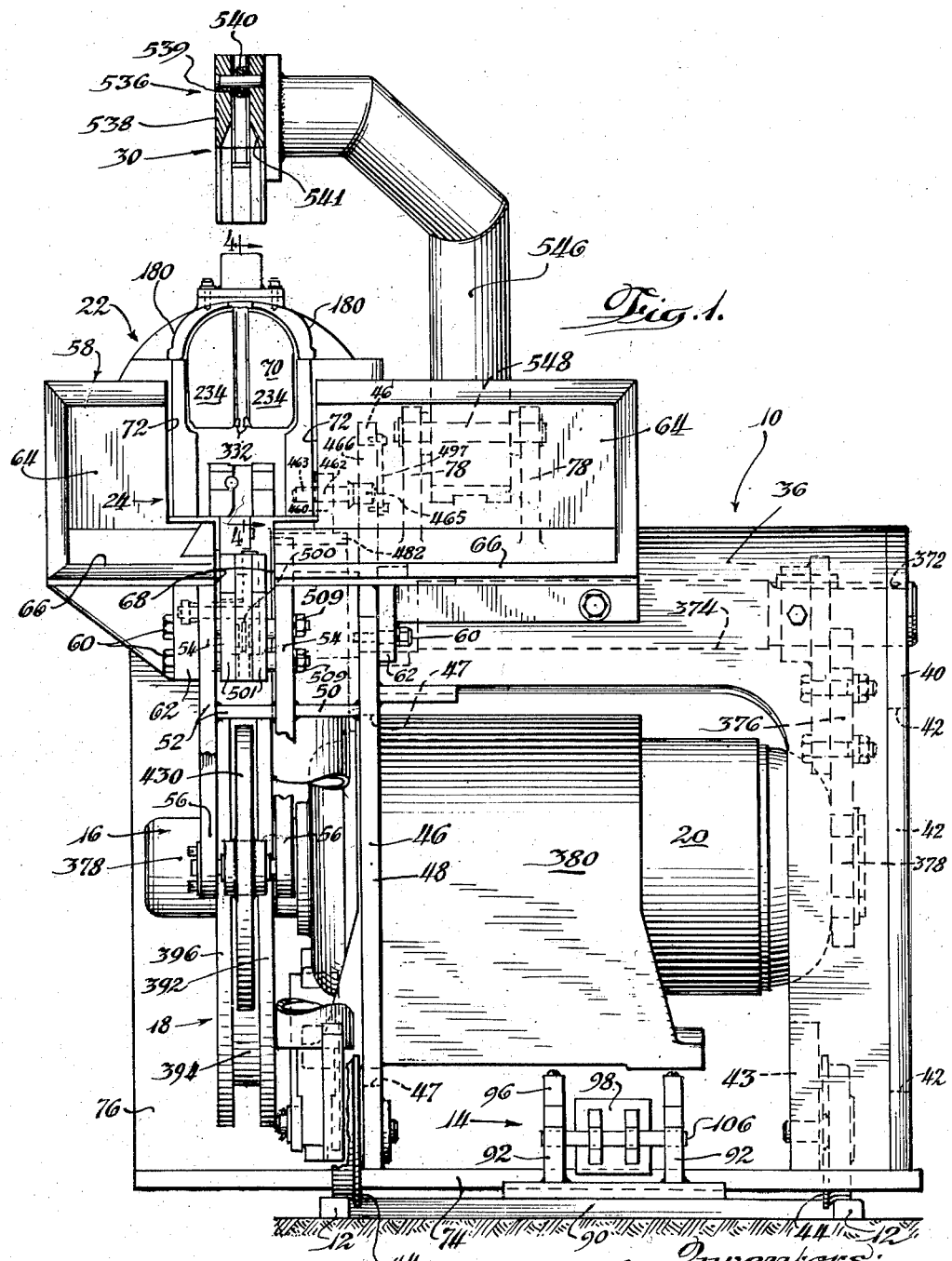
Fig. 1 is an elevation of the front of a strapping machine embodying our invention.

The machine embodying our invention operates generally in the following fashion: When a starting button is actuated, a length of strap is fed out from a source of supply, such as a reel, to encircle the bundle to be bound, with the free and supply ends of the strap overlapping at one side of the bundle. When enough strap has been fed out to loop around the bundle and obtain the desired overlap of the loop ends, the strap feed, or more specifically the motor driving the feed, is reversed. Simultaneously with this power reversal, the free end of the strap is tightly gripped and anchored and a seal is placed around the overlapping strap portions. The reversal of the motor retracts the slack in the strap until the loop engages the package tightly, at which point the retraction is stopped, a joint is formed in the overlapping strap portions and embracing seal, and the loop of strap binding the bundle is severed from the source of strap supply. It may be desired that the machine be drawn back somewhat from its operating position during the placement of a bundle for the strapping operation, and in such case the positioning of the machine is integrated with the general cycle of operation to advance the machine forward when a bundle binding band is to be formed and to retract the machine after the seal has been formed and the strap severed.

To facilitate description of our machine it may be analyzed into several subassemblies. A carriage 10 carries the operating parts of the machine and is mounted to be movable on tracks 12. A carriage positioning assembly 14 is provided to accomplish the desired moving of the carriage forward upon the initiation of a binding operation and backward upon the completion of the binding operation. A strap feeding assembly 16, consisting generally of a strap supply reel 18 and a reversible motor 20, serves to feed forth the strap 21 to encircle the bundle and to retract the excess strap after bundle encirclement. A head 22 houses a jaw assembly 24 whose function it is to seize the free end of the strap after the bundle has been encircled, to hold it against retraction, to form the joint and sever the standing portion (i. e., the portion going to the source of supply) of the strap after the strap has been tensioned about the bundle. The head also includes a jaw powering assembly 26 to move the jaw assembly to accomplish its various functions and a seal magazine and feeding assembly 28 which stores the seals and delivers them to the jaw assembly for the formation of the joints.

A strap channel assembly 30 directs the fed strap about the bundle and returns it to overlapping relation with the standing portion thereof, and a tension controller assembly 32 transmits the retractive force of the motor on the strap so as to distribute the force to both the free end of the strap gripped by the jaw assembly and the standing portion. The motive power of the machine, except for the motor powered feeding and retraction of the strap, is pneumatic pressure (Fig. 16), and the application or relief of pressure to the several powered parts simultaneously or successively as may be required is accomplished by an integrated electrical circuit (Fig. 17). It will, of course, be understood that many parts in the above assemblies interact with parts in other assemblies and that consequently an exact and exclusive classification of the parts into the above assemblies must be considered at best arbitrary.

Carriage

Figure 2:
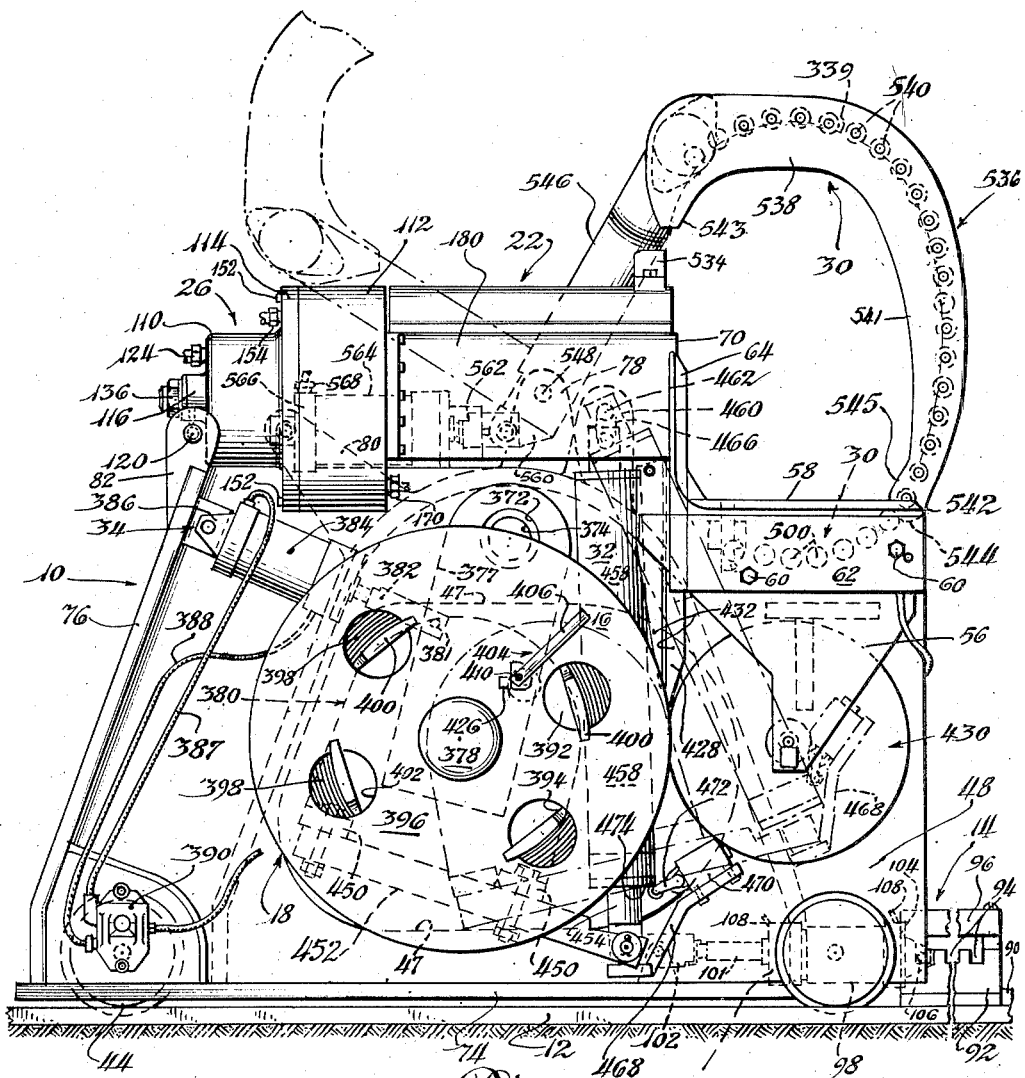
Fig. 2 is an elevation of that side of the machine which appears as the left side of Fig. 1.
Figure 3:
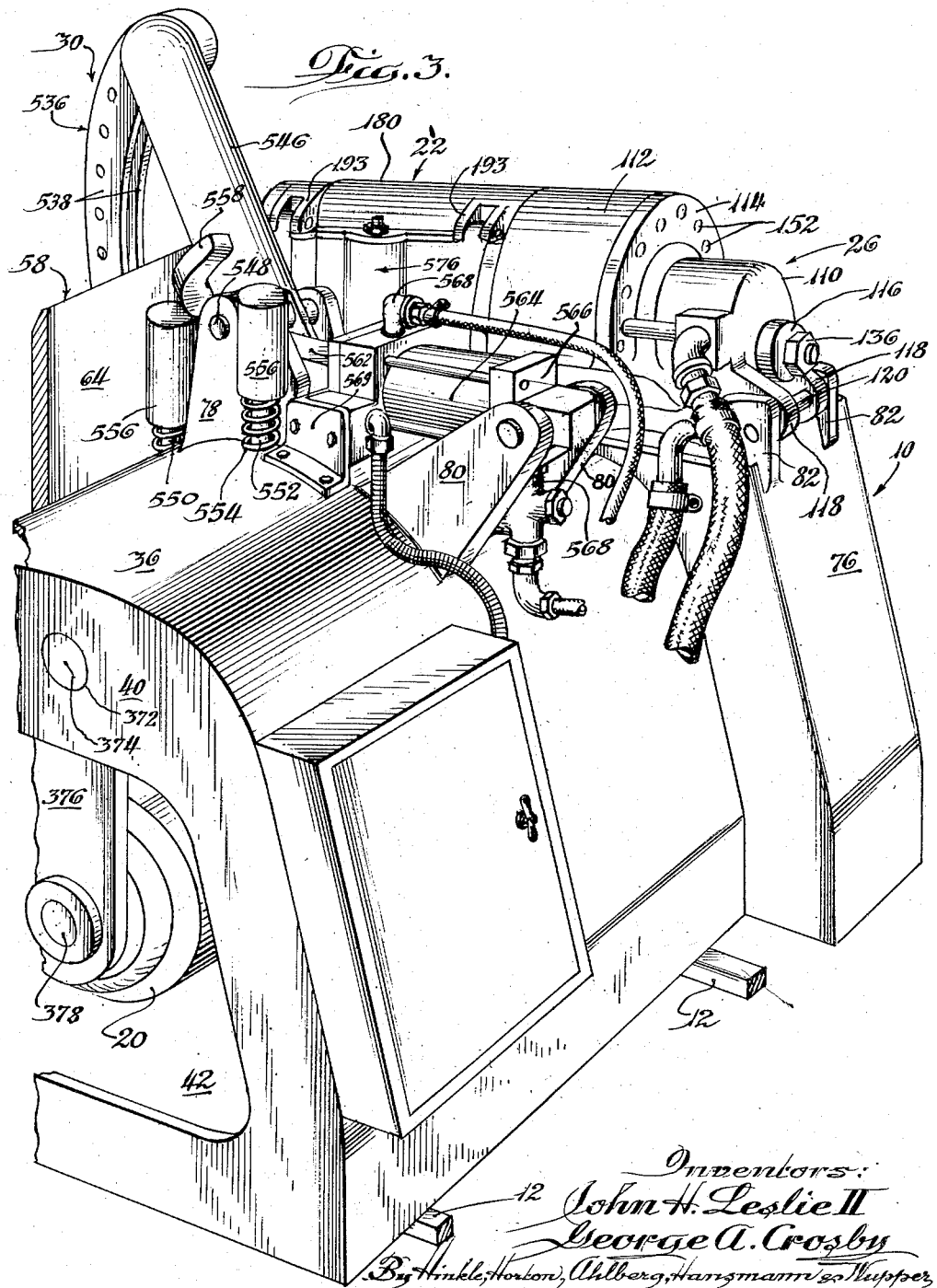
Fig. 3 is a perspective of the machine from the rear right-hand corner.

Referring particularly to Figs. 1, 2 and 3, the carriage is an irregularly shaped body formed of welded steel. On one side it includes an arched portion 36 within which the motor 20 is secured. The outer end of the arch is closed by a vertical outer plate 40 which has formed therein a central opening 42 to permit access to the motor 20. A cross piece 43 adjacent the plate 40 carries at its lower corners flanged wheels 44 which ride on the parallel tracks 12. The other end of the arched portion 36 is closed by an inner vertical plate 46 which likewise has a central opening 47 formed therein to accommodate the motor and associated mechanism. This plate similarly carries flanged wheels 44 at its lower corners which ride on the other of the tracks 12. The plate 46 extends substantially forward of the arch 36 as at 48. From this forward portion 48 a support 50 extends horizontally outward away from the arch 36 which carries on its outer edge a vertically oriented member 52 having an H-shaped cross section. The upwardly extending arms thereof define brackets 54 and the downwardly extending arms define ears 56.

A divided table 58 is mounted on the top of the forward plate portion 48 and brackets 54 as by bolts 60 passing through downwardly extending table supports 62 and the brackets and forward plate portion. This table may or may not support the bundle being strapped. The table 58 has also welded to the back edge thereof an upstanding wall 64. The table sections 66 defined by the division 68 are formed separately and the wall segments are so spaced as to accommodate the face 70 of the head 22 between the opposing edges 72 thereof, as illustrated, when the table sections are secured in place.

The carriage also includes a floor plate 74 extending across the bottom of the machine and a back wall plate 76 welded to the rear edge of the inner plate 46. Upstanding pairs of ears 78 and 80 are welded to the upper portion of the arch 36 adjacent the inner plate 46 which serve to mount members of the strap channel assembly 30 for pivotal movement. Likewise ears 82 are welded to the back wall plate 76 at the upper corners thereof to which the head 22 is secured for pivotal movement.

Carriage positioning assembly

In some applications no provisions for movement of the machine need be made. Where the bundles are light and are to be introduced into the machine manually, a fixed positioning of the machine is possible and, from the point of view of expense, desirable. However, it is anticipated that extensive use of the machine will be found in such industries as the steel industry for strapping exceedingly heavy coils of strip steel or wire stock which will be automatically delivered to the machine as by a conveyor line which may sustain the weight of the bundle during strapping. The face of the machine, while sturdy, is not sufficiently damageproof to withstand a constant battering from such heavy coils as they are delivered by a conveyor line into the proper position for strapping before the machine. Provision, therefore, is made for maintaining the machine in a position withdrawn somewhat from the line and for advancing the machine to the line when a strapping operation is to be performed. This movement of the machine may be integrated into the general cycle of operation.

In the illustrated embodiment the rails 12 on which the wheels 44 ride will be oriented perpendicularly to the conveyor line in order to provide for this withdrawing or advancing of the machine, and are spaced by the ties 90. The forward of the ties 90 has welded thereto and extending backward therefrom two spaced vertical plates 92 having rectangular notches 94 formed on the upper edges thereof. Retaining bars 96 are secured to the plates 92 to overlie the notches 94 in the upper edges thereof. A pneumatic carriage positioning cylinder 98 is connected at its rod end 100 by a piston rod 101 and a yoke 102 to the floor 74 of the carriage. The head end 104 of the cylinder 98 has mounted thereon a horizontally disposed cross pin 106, the ends of which extend beyond the sides of the cylinder 98 and are adapted to lodge in opposite notches 94 of the spaced plates 92. The retaining bars 96 prevent displacement of the pin 106 from the horizontal in the course of moving the pin between notches. The positioning cylinder 98 has pneumatic fittings 108 at its head and rod ends for the admission or relief of pneumatic pressure. By admitting pressure to the rod end 100 of the cylinder and relieving pressure in the head end 104 thereof, the carriage 10 will be drawn forward so as to position the machine for strapping bundles delivered in a conveyor line whereas admission of pressure to the head end 104 and relief of pressure in the rod end 100 will have the effect of forcing the carriage backward to withdraw the machine from the conveyor line. The several notches 94 in the spaced plates 92 permit a variation of machine positioning for varying placement of a conveyor line or of the bundles being delivered thereby.

Head

Figure 4:
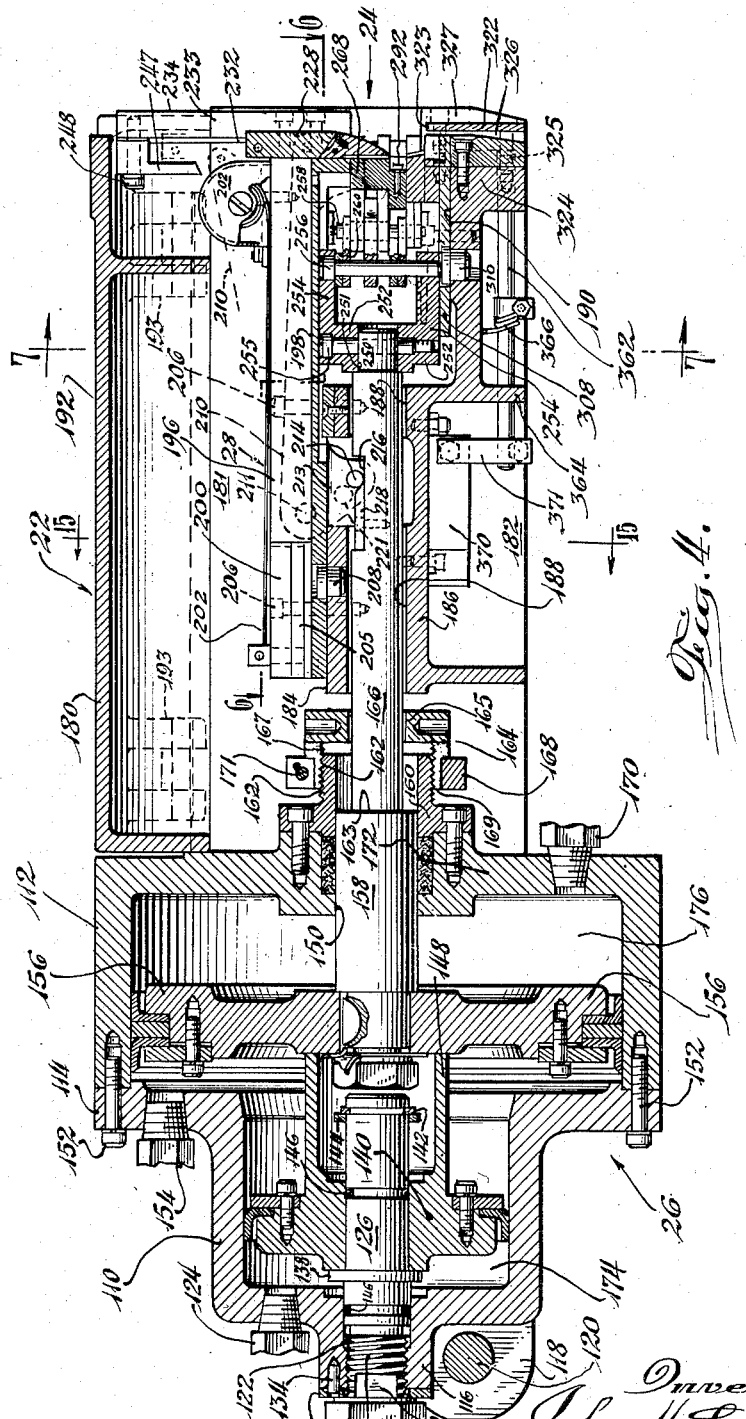
Fig. 4 is a section through the head taken substantially on the line 4—4 of Fig. 1.

As was pointed out before, the head 22 is pivotally secured for vertical movement by the ears 82 to the carriage 10 and encloses the jaw assembly 24, the seal feeding assembly 28 and the jaw powering assembly 26. Referring additionally to Fig. 4, the jaw powering assembly 26 constitutes the rear portion of the head and consists of a rearward gripping cylinder 110 and a forward sealing cylinder 112 of greater diameter than the gripping cylinder, the two cylinders being arranged in tandem relation. The gripping cylinder 110 is a cup-shaped element having an outwardly extending flange 114 around the forward mouth thereof and an axial protrusion 116 and two vertically disposed ears 118 on the rear thereof. A pin 120 passing through the ears 118 and the ears 82 links the head 22 pivotally to the carriage. A threaded axial hole 122 is formed through the protrusion 116 and a pneumatic fitting 124 is provided adjacent the protrusion for admission or relief of pressure in the cylinder 110.

A guide rod 126 is firmly fixed in the axial hole to extend axially into the cylinder 110. The rod is fixed in the hole 122 by an exteriorly threaded end 128 with flat spots 130, a washer 132 having corresponding flat spots to control the rotation of the rod, a pin 134 which prevents rotation of the washer and a nut 136 threaded on the rod 126 which secures the pin 134 in place. The guide rod 126 has formed thereon an integral ring 138 which limits the rearward travel of the piston 140 and a groove for a snap ring 142 to retain a forward limit ring 144. It also has formed therein packing grooves for packing 146 to effect a seal between the guide rod and the cylinder 110 and piston 140. The piston is of conventional structure slidable on the guide between the limit rings 138 and 144 and has a cup-shaped extension 148 which extends forwardly of the forward end of the guide 126.

The sealing cylinder 112 is another cup-shaped element having an axial hole 150 in the forward end thereof and which is secured at its rear end to the flange 114 of the gripping cylinder 110 by bolts 152. The flange of the gripping cylinder has a pressure fitting 154 therein to admit or relieve pressure in the rear end of the sealing cylinder 112. Slidable in the sealing cylinder 112 is a piston 156 of substantially conventional design. This piston has secured thereto a piston rod 158, hereafter termed a push rod, which extends forwardly through the hole 150 in the forward end of the sealing cylinder 112. The hole 150 in the sealing cylinder 112 through which the push rod 158 extends is provided with a packing gland 160 which is externally threaded as at 162. The push rod 158 is of reduced diameter 166 toward its forward end so as to provide a shoulder 163 thereon. Threaded on the packing gland 160 is an annular adjustable stop 164 which cooperates with shoulder 163 to arrest the forward movement of push rod 158, 166. Stop 164 includes an inwardly directed flange 165 embracing closely but slidably the reduced portion 166 of the push rod. The threaded portion 167 of stop 164 is slotted as at 169. A lock ring 168 fits over the threaded portion of stop 164, and, by tightening of a locking screw 171 compresses the threaded portion inwardly upon the packing gland 160 to prevent rotation of the stop 164 and hence the longitudinal movement thereof. By loosening the lock ring 168 and rotating the stop 164 so as to move it in a forward or rearward direction relative to shoulder 163, the forward travel of the push rod may be terminated at any selected point. A pressure fitting 170 is provided in the forward wall 172 of the sealing cylinder so as to admit or relieve pressure in the rod or forward end thereof.

The cup-shaped forward extension 148 of the gripping piston 140 extends forward sufficiently to enter the sealing cylinder 112 when the gripping piston is in its rearmost position and limit the rearward movement of the sealing piston 156 adjacent the flange 114 which defines the rear wall of the sealing cylinder. The movement permitted the gripping piston 140 between the rings 138 and 144 is such as to advance the sealing piston 156 a substantial part of its travel through the sealing cylinder 112. The setting of the stop 164 is such as to permit a further forward travel of the sealing piston 156 after maximum advancement by the gripping piston 140.

It will thus be seen that admission of pressure into the head or rear end of the gripping cylinder 110 through fitting 124 will move the gripping piston 140 forward, and, by virtue of the engagement of the cup-like extension 148 thereof with the sealing piston 156, likewise will move that piston forward, so advancing the push rod 158. This movement is limited by the ring 144. Pressure admission between the gripping piston 140 and the sealing piston 156 through fitting 154 will have the effect of advancing farther the sealing piston to the limit permitted by the stop 164. Admission of pressure to the rod or forward end 176 of the sealing cylinder 112 through fitting 170 will force backward both the sealing piston 156 and the gripping piston 140 to the point where the gripping piston engages the ring 138.

*Seal magazine and feed assembly*

Referring particularly to Figs. 4, 5, 6, 7 and 7A, that part of the head 22 extending forwardly of the jaw powering assembly 26, and hereinafter referred to as the sealer housing 180, is an elongated flat sided housing which is divided substantially into upper and lower compartments 181 and 182, respectively. The line of compartment division may be considered to occur along the top 184 of a support 186 which extends irregularly through the lower compartment 182 of the sealer housing and which provides a series of supporting surfaces. The support 186 may be integrally cast with the sealer housing 180. It furnishes, among other things which will be subsequently set forth, the annular clearance holes 188 for the push rod 158, 166, the horizontal surface 184 supporting the magazine block 196, and the surface 190 to which the jaw assembly floor is secured, which latter elements will be described later.

In the upper compartment 181 of housing 180 is contained the seal magazine and feed assembly 28, and in the lower compartment, there is the jaw assembly 24. The top of housing 180 is provided with an opening closable by a cover 192 hinged thereto as at 193 to make accessible the seal magazine for the replenishment of the supply of seals 194.

The seal magazine and feed assembly includes the rectangular block 196 which extends substantially the length of the housing 180 and has a longitudinal channel 198 formed in the upper surface thereof. This channel 198 constitutes the seal magazine in which the stack of nested seals 194 is placed. These seals are preferably of the type characterized, in a joint, by sheared and bent tabs at the edges and are fully described in the application of John H. Leslie II, Serial No. 47,563, filed September 3, 1948 and issued as Patent No. 2,610,374, dated September 16, 1952. A follower 200 impelled forward by the spring 202 lies in the seal magazine channel 198 and serves to move the seals forward as they are used. A longitudinal horizontal groove 204 is formed in one wall of the magazine channel and a complementary projection 205 is formed on the follower 200 to ride in the groove, the groove and projection cooperating to retain the follower in the magazine. The magazine block 196 is secured to the surface 184 of the support 186 by bolts 206, and a large diameter dowel 208, fitting in opposing sockets in the block and support, adds strength to the connection against longitudinal thrust on the block.

Two ejector arms 210 are pivotally attached at their rear ends by pivot pins 211 to opposite sides of the magazine block 196. These ejector arms extend forwardly along the block and project slightly beyond the forward end thereof. These arms have downwardly projecting ears 213 adjacent their rear ends which extend below the magazine block 196, and forward ears 212 which are adapted to rest on the upper element of the jaw assembly 24 to limit the downward travel of the arms 210. A horizontal rod 214 passes between the ears 213 below the block and lies within a notch 216 formed on the upper side of the push rod 158, 166. The bottom of the notch is reinforced by a hardened steel plate 218. Thus forward motion of the push rod 158, 166 will move the rod 214 forward and upward and hence the forward part of the arms 210 will be pivoted upward. Headed studs 220 are provided on the magazine block 196 rearward of the arms 210 and similarly headed studs 221 are provided on the ejector arms 210 between the pivot pins 211 and the rod 214. Coil springs 222 under tension are anchored at opposite ends to the studs 220 on the magazine block 196 and the studs 221 on the ejector arms 210 so that, as the push rod 158, 166 is retracted, downward movement of the arms 210 and a relocation of the rod 214 within the notch 216 in the push rod is insured.

The lower ends of upstanding links 224 are pivotally fixed to the forward ends of the ejector arms 210 by pins 225. A yoke 226 passes between the upper ends of links 224 and an ejector 228 is suspended between the links 224 on the yoke 226. The ejector 228 is positioned on the yoke 226 to be in vertical alignment with the channel 198 which defines the seal magazine.

The ejector 228 has vertical grooves 230 formed on its sides adjacent the front face 231 thereof which slidably engage complementary ribs 232 formed on the opposing edges 233 of spaced apart face plates 234 secured by screws 235 to the front of the magazine block 196. The ribs 232 are located on the rear part of the opposing edges 233 so that the front face 231 of the ejector is spaced well back from the faces of the face plates 234. The edges 233 of the face plates thus serve to provide not only a guide for the ejector 228, as described above, but also a guide or track for the strap by virtue of the spaced apart edges 233 forward of the ejector 228.

The ejector 228 has an upwardly and inwardly inclined notch 236 formed in the bottom thereof. An ejector finger 238 is pivotaly supported within this notch and extends downward below the ejector body 228. The inner face 240 of the ejector finger 238 is shaped so that its major portion lies outwardly of the inner face 241 of the ejector 228 and forms a shoulder 242. Outwardly of the point of suspension 243 between the ejector body 228 and the ejector finger 238, a socket 244 is formed in the ejector finger which lies opposite the notch 236 in the ejector body. A spring 245 is situated within this socket and bears against the ejector body to urge the lower end of the ejector finger 238 inward.

It has already been explained how movement of the push rod 158, 166 serves to effect vertical movement of the forward end of the ejector arms 210. The arcuately upwardly movement of the ends of the arms imposes vertical movement on the ejector body 228 by virture of the links 224. The ejector body is moved upward until the shoulder 242 is well above the top of the stack of seals in the magazine. The upward movement of the ejector is limited by the stop 247 secured by bolts 248 to the upper part of the face plates 234. The ejector body 228 being removed from its position in front of the magazine 198, the follower 200 forces a seal from the magazine 198 against the back surfaces of face plates 234, and the downward movement of the ejector 228 attendant upon a retraction of the push rod 158, 166 depresses the shoulder 242 of the ejector to carry a seal downwardly to position it in front of the jaw assembly 24. The ejector finger serves to prevent the seal from falling forward out of the jaw assembly.

*Jaw assembly*

Referring particularly to Figs. 4, 5, 6, 7, 7A, 8, 9, and 10 the forward extremity 250 of the push rod 158, 166 is of still further reduced diameter and fits in a hole 251 formed in a yoke 252 having forwardly extending arms 254. The sides of the yoke 252 extend laterally outward substantailly as at 253. A pin 255 passes vertically through the yoke and a hole formed in the forward extremity 250 of the push rod to couple the rod and yoke together. A pin 256, hereinafter referred to as the yoke pin, extends between the arms 254 of the yoke. A pair of intermediate pins 258 are situated forward of the yoke pin 256 and are connected to the yoke pin by upper and lower pairs of links 260.

The working members of the jaw assembly constitute two pairs of folding jaws 262, a notcher 264, gripping jaws 266, a chair carrier 268 and a cutter 270. The folding jaws 262 are opposed paired members, each of the pair being generally rectangular and having a hook-like portion 267 formed on one end thereof which terminates in a notch 269. The members of each pair of these folding jaws are disposed so that the hook-like portions 267 face each other. The folding jaws have forward and rear holes 271 formed therein and are mounted by these holes, respectively, on a pair of forward pins 272 and the intermediate pins 258. The holes are adapted to fit their respective pins closely. Between the pairs of folding jaws 262 is mounted the notcher 264 which is a substantially rectangular plate having a deep notch 274 formed centrally on its front edge. The notcher is perforated by two longitudinal slots 275 adjacent the front edge thereof, two large diameter holes 276 adjacent its sides, and a central longitudinally oriented slot 277 adjacent the rear edge thereof. The forward slots 275 and the rear slot 277 permit relative longitudinal movement between, respectively, the forward pins 272 and yoke pin 256, through which slots these pins pass, and the notcher 264. The holes 276, which contain the intermediate pins 258, permit the pins to move both laterally and longitudinally with respect to the notcher. The rear edge 278 of the notcher lies adjacent the face 280 of the yoke 252.

The jaw assembly likewise includes a chair carrier 268 which is mounted on the forward pins 272 by two closely fitting holes 282. The top side of the chair carrier 268 is integrally formed to include a vertical chair or anvil 284 presenting a plane surface 285 to the front of the machine which extends upwardly to lie between the pairs of folding jaws 262 and in the rear portion 286 of the notch 274 formed in the notcher. The chair 284 is formed on a horizontal portion 288 of the carrier proper, the front edge of which has a flat bottomed notch 290 formed therein, the bottom of the notch 290 lying slightly forward of but in vertical alignment with the face 285 of the chair. This slight protrusion of the notch bottom limits the descent of a seal as it is delivered to the jaw assembly 24 by the ejector 228, the bottom edge of the seal resting on the chair notch edge and the back of the seal against the chair face 285. A recessed tapped hole 291 is provided in the lower part of bottom of the notch and a bolt 292 is situated in the hole, the head of which extends slightly below the horizontal portion 288.

Also included in the jaw assembly below the chair carrier 268 is the pair of gripping jaws 266. These jaws are generally rectangular in outline like the folding jaws 262 and have also the forwardly projecting inwardly directed hook ends 293. These hooks however lack the notches 269 of the folding jaws 262 and have a slight downward and outward taper 294 at their ends. The under sides of the rear part of the gripping jaws 266 are cut away as at 296 to provide inner portions 297 of reduced thickness. The gripping jaws 266 fit closely about and are carried by the forward and intermediate pins 272 and 258, respectively. Between the gripping jaws there is a movable cutter blade 270 which is characterized by a concave cutting face 298, longitudinal guide ribs 300, longitudinal shoulders 302 and a transverse shoulder 303 formed on the top surface thereof. The shoulders 302 afford clearance to the inner portions 297 of the gripping jaws 266 and permit a nesting of these jaws and the cutter such that the cutting edge 304 of the latter is but slightly below the lower edge of the jaw hooks 293 of the former (Fig. 7). The shoulder 303 projects upward for engagement with the downward extending head portion of the bolt 292 in the chair carrier 268. The cutter is longitudinally aligned with the lower yoke arm 254.

The intermediate and forward pins 258 and 272 project substantially above and below the assembly of jaws, cutter, and chair carrier. The ends of these pins fit into guide grooves 306 and 307 which are provided respectively in the bottom of the magazine block 196 and in the plate 308 which constitutes the jaw assembly floor and which is secured to the support surface 190. The plate 308 is secured to the support by bolts 309, and a large diameter dowel 310 gives additional strength to the connection against longitudinal thrust. The grooves in both surfaces are identical so only those in the floor 306 will be described. The ends of the forward pins 272 lie in longitudinally extending grooves 312 which terminate at their forward ends in shoulders 314. The ends of the intermediate pins 258 lie in longitudinal grooves 316 which may be aligned with the grooves 312. At their forward ends the grooves 316 are intersected by outwardly extending lateral grooves 318.

The plate 308 also includes a central longitudinal channel or guideway 320 in which the cutter blade 270 is movably contained. Channel 320 has grooves 319 (Fig. 5) formed in the sides thereof to receive the ribs 300 of the cutter.

Referring to the same figures, but with particular reference to Figs. 6 and 9, it will be seen that in the rearward or retracted position of the jaw assembly 24 the yoke pin 256 and the forward pins 272 define a V, and the intermediate pins 258 lie outside of the lines between the forward pins 272 and yoke pin 256. But, as shown in Fig. 10, as the yoke 252 is moved forward by the push rod 158, 166, the links 260 advance the assembly 24 along the longitudinal portions 312, 316 of the guide grooves 306 until the forward pins 272 reach the shoulders 314 terminating their forward travel. At this point the intermediate pins 258 lie opposite the lateral grooves 318 and are thus permitted to travel outward as the push rod 158, 166 continues to move the yoke 252 and the yoke pin 256 forward. The lateral extensions 318 of grooves 306 permit sufficient lateral outward movement of the intermediate pins 258 to enable the yoke pin 256 to move to a position forward of the straight line connecting the intermediate pins 258, as shown most clearly in Fig. 10.

To translate these pin movements into terms of jaw movement: In the retracted position of the assembly (Figs. 6 and 9) the complementary members of the pairs of folding and gripping jaws 262 and 266 are spaced apart. With the forward movement of the push rod 158, 166 attendant upon admission of pressure to the gripping cylinder 110, the assembly as a whole is advanced without any change in the relative position of the jaws until the forward movement of the forward pins 272 is checked by the shoulders 314. However, when, in the advance of the jaw assembly 24 the forward pins 272 engage the groove ends 314, the intermediate pins 258 commence outward movement in the lateral extensions 318 of grooves 306, and the folding jaws and gripping jaw members are rotated about the forward pins 272 to move the hook-like ends thereof toward each other. This movement of the jaws has an appreciable inward or rearward component. The notches 269 in the ends of the hook-like portions 267 of the folding jaws 262 engage the edges of the seal flanges 194f and fold the flanges loosely about the two overlapping strap portions 321, 328 (Fig. 10), utilizing the rearward component of motion to follow the flange edges. The hooks 293 of the gripping jaws 266 approach each other on the outside of the free end 321 of the strap and move it in a rearward direction with respect to the machine, i. e., to the left as viewed in Figs. 9 and 10. At the completion of this initial movement of the push rod 158, 166 the yoke pin 256 still lies slightly to the rear of the line between the two intermediate pins 258.

Now, upon admission of pressure to the head end of the sealing cylinder 112 the push rod 158, 166 advances the yoke pin 256 forward of the line between the two intermediate pins 258 (Fig. 10). In so doing the face 280 of the yoke 252 meets the rear edge 278 of the notcher 264 and advances the notcher relative to the folding jaws. The folding jaws, of course, are held substantially against movement by the stationary forward pins 272. This advance of the yoke 252 moves the notcher against the seal and its enclosed strap which are held between the folding jaws to notch the strap portions and seal at opposite sides in the longitudinal central region of the seal. Simultaneously with the movement of the notcher, the face of the lower yoke arm 254 meets the rear surface of the cutter 270 and advances it.

Upon retraction of the push rod 158, 166 to its starting position the yoke pin 256 is drawn backward, first drawing the intermediate pins 258 out of the lateral grooves 318 and opening the folding and gripping jaws 262 and 266. Thereafter the jaw assembly 24 as a whole is retracted, the screw 292 in the chair carrier 268 catching the shoulder 303 on the cutter blade 270 and moving it back with the jaw assembly.

Fixed to the face of the machine below the jaw assembly 24 is a fixed cutter block 322 adapted to cooperate with the cutter blade 270, the top edge 323 of the cutter block being aligned with the cutting edge 304 of the movable cutter blade 270. This cutter block is secured to a lower vertical portion 324 of the support 186 in the head 22 by bolts 325, and central vertical grooves 326 and 327 are formed respectively on the inside and outside thereof to constitute channels for the strap fed from the strap feed assembly 16 and for the free end of the strap after bundle encirclement as will be described subsequently.

The free end 321 of the strap 21 passes upward in the outside groove 327 of the cutter block. As stated before, the forward movement of the push rod 158, 166 has the effect of bringing the gripping jaws 266 toward each other and rearward to seize and deflect inwardly the free end of the strap. The gripping jaws are located in their terminal forward position slightly above the upper outer corner or shoulder 330 of the cutter block. Thus, as the gripping jaws 266 seize and deflect the free end of the strap inwardly, the strap is bent sharply over and against the outer corner 330 of the cutter block and there held (Fig. 7A). In this manner the two gripping jaws 266 and the kink or sharp bend in the strap over the top upper outer corner or shoulder 330 of the cutter block effectively insure that the free end of the strap is securely anchored during the tensioning operation.

As was previously stated, the cutter blade 270 operates substantially between the gripping jaws 266. The final forward movement of the push rod 158, 166 serves to advance the cutter blade 270 across the groove or channel 326 through which passes the strap portion 328 upon the reel, and over the edge 323 of the cutter block 322. The cutter blade is not, however, advanced far enough to meet the portion of the free end 321 of the strap which has been offset over the outer corner 330 of the cutter block 322 as described in the preceding paragraph. Thus the advance of the cutter blade severs the strap from the source of supply without disturbing the anchored free end.

After the free end of the strap has been pushed through strap channel assembly 30 to pass around the bundle, as will be presently explained, its movement is intercepted and it initiates the tensioning operation as will be now explained.

The two face plates 234 between which the seal ejector 228 is guided and which define the edges 233 of the strap track have mounted in their lower edges for lateral movement two rectangular strap interception members 332, the lower edges of which adjacent their opposing ends are slanted upwardly and inwardly as at 333 (Fig. 7). These interceptors or barriers are spaced forward of the ejector 228 on its lower position sufficiently, as indicated at 334, to permit a single thickness of strap to pass between them and the ejector but not to permit the passage of a second thickness of strap. The strap, being fed from the strap feeding assembly 16, is thus permitted to travel inside these intercepting members 332 for bundle encirclement, but the free end 321 of the strap, after bundle encirclement, is halted thereby. The ejector occupies its lower position during the period of strap feeding. The interceptors 332 are slidable in transverse grooves 335 in the face plates 234 which are closed over a portion of their length by blocks 336 to be positioned across the strap track or to be withdrawn therefrom (Fig. 7). They have rearwardly extending blocks 338 at their outer ends which have notches 339 formed therein. The interceptors 332 are operated by arms 340 mounted on the plate 308 for pivotal movement by bolts 342 (Figs. 6, 9, and 10). The arms carry at their forward end upstanding pins 344 which fit in the notches 339. At the rear end of the arms are cam surfaces 346 which cooperate with the laterally extending yoke sides 253 to control the movement of the interceptors 332. The arms 340 are positioned in about the same horizontal plane as the upper pair of folding jaws 262 and may have wings 348 extending backward on the inside from the forward end thereof.

When the push rod 158, 166 is in its rearmost position the cam surfaces 346 ride on the sides 253 of the yoke, as shown clearly in Figs. 6 and 9, thereby positioning the inclined edge 333 of the interceptors 332 across the strap track 233. As, however, the push rod 158, 166 moves forward, the yoke 252 is removed from between the cam surfaces 346 as shown in Fig. 10. Thereafter, the outward movement of the rear portions of the folding jaws 262 brings them against the wings 348 and so forces the forward ends of the arms 340 apart, withdrawing the interceptors from the strap track as shown in Fig. 10.

There are likewise strap directing levers 349 spaced somewhat below the interceptors 332 which are pivotally mounted on the plate 308 by bolts 350. The forward extremities of these levers have inside surfaces 352 angled sharply upward and inward. Their purpose is to receive the free end of the strap as it passes up the outside track 327 of the cutter block 322 and direct it closely in front of the folding jaws 262 and notcher 264 and into the interceptors 332. These directors are spring loaded toward closure by springs 354 seated in recesses 355 in the rear edges thereof and bearing against a lateral portion 356 of the support 186. They are operated as are the interceptors 332 by the movement of the laterally extending yoke sides 253 through the medium of camming surfaces. In this case the jaws 349 have inwardly extending surfaces 358 forward of the yoke sides 253 when the yoke is in its rearmost position. As the yoke moves forward the directors are cammed outward against the force of the springs 354 to remove the surfaces 352 from their position across the strap track as shown in Fig. 10.

A hole 360 is formed in the cutter block 322 and through this hole a finger 361 projects into the outer strap groove 327 into a position to be engaged by an advancing edge of the free end of the strap as the strap is pushed up through that groove. Finger 361 is connected to a switch shaft 362 by means of a crank 363. Switch shaft 362 is journaled at opposite ends in support portions 324 and 364 of support 186 and is biased by a spring 366 so that normally finger 361 is held in the line of travel of the free end of the strap. The strap groove 327 is wide enough to provide clearance for the passage of the strap past finger 361 and spring 366 is sufficiently powerful to deflect the free end of the strap sidewise, as will be later explained. The strap track 233 defined by the face plates immediately above the jaw assembly is flared downward and outward as at 367. The switch rod 362 is mounted to operate a switch 370 by arm 371 upon rotary movement thereof. As the free end 321 of the strap passes upward along the groove 327 on the cutter block, it is deflected from a strictly vertical path by the switch finger 361 but the switch finger is not yet operated because of the heavy biasing of spring 366. Upon continuing feed, however, the free end of the strap enters the flared portion 367 of the track 233 and is deflected to a directly vertical path or travel. This lateral movement of the strap forces the edge thereof against finger 361 with sufficient force to overcome the spring 366 with the result that shaft 362 is rotated to actuate the switch 370. The operation of switch 370 reverses the direction of motor rotation, as will be later explained.

*Strap feed assembly*

Referring to Figs. 1 and 2, the inner and outer plates 46 and 40 of the carriage 10 have horizontally aligned holes 372 formed therein in which a shaft 374 is journaled for rotation. A pair of hangers 376 and 377 are keyed to this shaft, hanger 376 being situated under the arch 36 adjacent the outer wall 40 and hanger 377 being situated generally under the head 22 adjacent the inner wall 46. The ends of the shaft 378 of the motor 20 are journaled for rotation in the lower ends of these two hangers. From this connection between the hangers 376 and 377 and the motor 20, it will be seen that the shaft and the motor housing 380, both with respect to each other and with respect to the carriage 10, may rotate freely. The hanger 377 under the head 22 has connected thereto by a pin 381 the rod end 382 of a pneumatic cylinder 384, the head end 386 of which is pivotally connected to the rear plate 76 of the carriage 10. The connection to the hanger 377 is made between the point of suspension 372 of the hanger and the shaft 378 of the motor. Pneumatic ducts 387 and 388 are connected at the head 386 and rod ends 382, respectively, of the pneumatic cylinder and a manually operable four-way valve 390 is situated on the carriage to control the admission of pressure to either end thereof and the attendant relief of pressure in the other end.

The shaft 378 of the motor 20 protruding beyond the hanger 377 under the jaw assembly carries the strap reel 18. This reel includes a back plate 392, a drum 394 and a removable cover plate 396. The drum is of a diameter which permits the placing thereover of a standard sized coil of steel strapping. The back plate has formed thereon a plurality of radial hook-like lugs 400 as a part of the drum 394 extending outwardly therefrom which cooperate with holes 402 formed in the cover plate to secure the latter to the back plate.

Rotation of the cover plate 396 in one direction or the other relative to the back plate 392 will either align holes 402 of the cover plate with the hooked lugs 400 of the back plate to permit removal of the cover plate to open the reel for reception of a strip coil or interlock the hooked lugs with the edges of the holes to lock the cover plate in place. A latch 404 (Figs. 11 and 12) on the cover plate produces the relative rotation between the back and cover plates of the reel so as to effect the locking or the release thereof. This latch includes a handle 406 which is fixed to a stem 408 by a key 409 and nut 410. A plate 412 is attached to the handle and stem to be rotatable therewith which has two detent pockets 414 formed therein corresponding to an open and locked position for the cover plate 396. The stem 408 extends through the cover plate and a block 416 attached to the cover plate. The block contains a spring loaded detent 418. The stem 408 terminates on the inside of the cover plate in a shaft 420 eccentric with the stem, and on the shaft 420 a ball bearing 422 is mounted. The other elements of the lock are a pair of parallel ribs 424 on the back plate 392 and a stop 426 on the cover plate 396 to intercept the edge of plate 412 and limit movement of the handle 406.

When the handle is turned so that the detent occupies the "open" pocket, the bearing 422 between the ribs 424 moves the cover plate with respect to the back plate so that the holes 402 in the cover plate are aligned with the lugs 400 to permit the removal or placement of the cover plate on the back plate. To lock the cover plate to the back plate, counterclockwise movement of the handle 406 (Figs. 2 and 11) moves the cover plate 396 counterclockwise with respect to the back plate 392, so bringing the hole 402 peripheries under the hook-like lugs 400. The stop 426 and the "stop" detent pocket 414 are situated to halt the counterclockwise handle movement at a point where the axis of the stem 408 lies radially inward slightly of the axis of the eccentric shaft 420 with respect to the center of the cover plate. The handle movement being checked slightly beyond the point of relative maximum reel cover displacement with respect to the back plate, an accidental unhooking of the cover due to sudden movement changes is impossible.

The strap reel 18 is placed on the carriage so that the strap coil 398 therewithin is in direct alignment with the strap guide 428. An idler roll 430 is secured to the ears 56 below the table 58 and is positioned to lie directly opposite the coil of strap 398 within the reel 18. The roll is of about the same thickness as the width of the strap and fits between the back plate 392 and the cover plate 396 of the strap reel.

The strap guide 428 comprises a pair of spaced apart plates 432 depending from the carriage 10 at a point directly below the jaw assembly 24 and in line with the strap track 233 therewithin to a point adjacent the rear vertical tangent of the idler roll 430. When the head 22 pivots to separate its front end from the plane of table 58 during the tensioning operation, as will be later explained, a gap is produced between the adjacent ends of strap groove 326 in cutter block 322 and strap guide 428. Upon the cutting of the strap the head 22 drops again to normal position, as will later appear, closing this gap. And to prevent the free cut end of the strap from escaping through this gap before it is closed a temporary bridge is formed across the gap. This bridge is composed of two overlapping guide segments. This arrangement will now be explained with special reference to Figs. 5 and 14.

The upper end of the strap guide 428 has an offset lower guide segment 434 provided with a strap slot 436 of about half the width of the strap which segment is secured to the upper end of the plates 432. Rearward of the strap slot 436 is a guide slot 438 through which a pin 443 projects. An upper guide segment 439, carrying the pin 443, lies beside lower segment 434 and is pivotally secured as at 440 to the lower part of the head 22. Upper guide segment 439 has a strap slot 441 of about half strap width formed in its edge to face the slot 436, and the two slots together constitute a strap confining guide since the guide segments 434 and 439 overlap regardless whether the head 22 is elevated or depressed. The segments 434 and 439 are interconnected by the pin 443 and slot 438 to form an expansible section of the strap guide 428 such that, when the head 22 is raised as mentioned before, there is no objectionable gap in the strap guide.

From this description the operation of the strap feed mechanism 16 may be readily understood. Under normal operating circumstances, pressure is present at all times in the head end 386 of the pneumatic cylinder 384. This pushes the hangers 376 and 377, and the motor 20 carrying the strap reel 18 to maintain the coil of strap in forcible contact with the idler or back up roll 430. Upon counterclockwise rotation of the motor (Fig. 2) the strap will be fed from the coil on the reel upward through the strap guide 428 in front of the jaw assembly for bundle encirclement. The friction existing between the turns of the coiled strap by virtue of the force exerted by the penumatic cylinder 384 on the strap coil against the idler roll 430 prevents slip between the turns of the coil, and the feed is thus positive. The retraction of the strap involves substantially a rewinding of the strap coil and no problem of slipping is encountered.

When the supply of strap on the strap reel is exhausted, the pressure in the cylinder 384 is reversed by the valve 390 to the rod end 382, which carries the motor and hence the reel away from the idler roll. Thereupon the cover 396 may be removed and a new coil of strapping placed on the drum 394. Reintroduction of pressure to the head end of the cylinder 384 will again force the strap coil against the idler roll 430 and condition the machine for a resumption of strapping operations.

*Strap tensioning assembly*

Referring particularly to Figs. 2, 5, 13 and 14, the motor 20 has mounted on the two feet 450 thereof which lie substantially under the jaw assembly 24, a forwardly extending arm 452, and the rod 454 of a piston 456 which fits inside an elongated tension controller or spacing cylinder 458 is pivotally connected to the forward end of this arm. The upper end of cylinder 458 terminates in an ear 460 through which a horizontal pin 462 passes. The ear 460 is situated in a pocket 463 formed on the side of the head 22 and the pin 462 extends into the wall of the head 22 and through the wall 464 of the pocket to project therefrom. The projecting end 465 of the pin lies in a vertical slot 466 formed in the inner plate 46. The forward end of the arm 452 also carries a bracket 468 on which is mounted a switch 470 having a switch arm 472 situated closely under the lower end 474 of the spacing cylinder 458.

The tension controlling cylinder 458 contains a heavy spring 474 under substantial compression, the compression measuring the tension of the strap about the bundle, which bears at one end against the piston 456 and at the other against a cylinder cap 476. The cap has an elongated cup 478 formed on the lower side thereof. Cup 478 is externally threaded as at 479 and encases the upper part of the spring 474. The upper part of the cylinder 458 is internally threaded over a substantial length as at 480 to receive the threads of cup 478. With this structure the spring may be inserted in the cylinder and the desired compression then may be attained by screwing down the cap over the threaded cylinder length 480. Reverse rotation of the cap is prevented and additional securement is provided by bolts 481 extending through the cap flange 482 into the cylinder wall. The cylinder possesses a filling plug 484 for applying oil.

The piston 456 proper is threaded on an extension 486 of the rod 454 and has a plurality of radially disposed holes 488 of relatively large diameter extending therethrough. The rod extension 486 has a passage 490 of small diameter formed by borings connected to a larger diameter passage 489 to provide communication between the two sides of the piston 456. An adjustable restricting member 491 in the form of a screw is threaded into the rod extension 486 at the juncture between the passages 490 and 489 to regulate the rate of oil flow from the lower side of the piston 456 to its upper side. A ring valve 492 is adapted to close the holes 488 and is urged toward closure by a light spring 494. A packing gland 496 makes fluid tight the fit between the rod 454 and the cylinder 458. The cylinder is partially filled with oil.

If the motor 20 in the instant case were fixedly mounted with respect to the carriage and the gripping jaws 266 likewise fixedly attached thereto and retraction and tension commenced after encirclement of a sharp edged bundle, the friction of the strap on one of the upper corners of the bundle would likely become sufficiently great to stop the retraction and leave slack strap beyond the point of binding. At best, a slack strap band would be the result. A most probable result would be a breaking of the strap. Therefore it was deemed most important that the bundle-encircling strap be tensioned at both ends—the free end of the strap as well as the standing portion which is tensioned by the strap retraction. The unique mounting of the motor and the jaw assembly and the use of the spacing cylinder 458 provide a complete and novel answer to this problem. Assuming the above stated characteristics of a strap being retracted about a bundle, but considering our disclosed structure, as the strap tends to bind around one of the upper corners of the package, the resistance to the retractive motion of the strap reel, and hence the motor shaft 378, will tend to stop its clockwise rotation (Fig. 2). Since, however, the motor continues to be powered, the tendency will be for the motor casing 380 to rotate in a counterclockwise direction. This will raise the forward end of arm 452 to exert an upward force on the jaw assembly 24 through the medium of the tension controlling and spacing cylinder 458. The jaw assembly gripping firmly the free end of the strap as before set out, the hitherto slack part of the strap band on the other side of the point of binding is drawn tight, so effecting a uniformly tensioned band. The tension controlling and spacing cylinder 458 and piston 456 constitute essentially a compressible spacer and the resistance to compression is determined by the spring 474. The application of compressive force to the cylinder in excess of the resistance of the spring will have the effect of moving the bracket 463 carrying the switch arm 472 upward relative to the lower end 474 of the cylinder 458, thereby actuating the switch 470 to terminate the retraction or tensioning of the strap. The linkage formed by the arm 452 and spacer 458 likewise hold the motor casing against rotation to insure rotation of the strap reel for proper strap feed. The means 489, 490, and 491 for restricting the oil flow upon release of compression to retard the return movement of the piston 456 prohibits a sudden kickback upon the motor when strap tension is released. The one end 465 of the pin 462 which lies in the vertical slot 466 of the inner plate 46 is so contained in order to limit the upward movement of the head 22, the slot being of sufficient length to permit substantially more lift than that normally encountered. The head 22, when in its lower normal position, is supported by the lower end of the slot 466. The slot may be covered by a plate 497.

*Strap channel assembly*

Referring particularly to Figs. 1, 2, 3, 5, and 14, different employments of our machine may render advisable different forms of strap chute to direct the strap around a bundle. Thus, for example, annular bundles such as coils of steel strip may be more easily and inexpensively presented to the machine for strapping in a vertical or standing position. On the other hand coils of wire may be presented to the machine more conveniently in a horizontal position. For the standing coils, what may be termed a 'front approach" type of movable chute such as that illustrated in Fig. 14, provides more easily the necessary clearance whereas what may be termed a "top approach" type of movable chute, like that shown in Figs. 1, 2 and 3, is preferable for the horizontally positioned bundles.

As will later appear, the opening and closing of the strap chute may be integrated automatically with the strapping operation or manually controlled. A factor influencing which type of control may be advantageous is whether or not the chute must be opened and closed for each strapping operation or can remain closed during several operations. Thus, when a vertically standing coil of strip steel is to be banded, the chute may be inserted through the central opening of the coil and thereafter the coil may be strapped at several points by turning the coil about its center without opening of the chute. Coils of rod or wire, on the other hand, may present the alternative requirement of opening and closing the chute for each banding operation. For example, a commonly practiced technique for handling such coils includes a tong manipulation whereby a set of two, three or more tongs are dropped into the center of the coil and the tong arms are then spread to hold the coil substantially horizontal and, if desired, carry the weight of the coil during the strapping operation. If such a coil is to be banded in several places, it will be seen that the interference of the chute with rotation of the coil and tongs as positioned for strapping necessitates a removal of the chute from the center of the coil with each band to be formed.

Since the two forms of strap channel assembly have one part substantially in common, i. e., a fixed channel or chute portion in the table 58, this part will be described first. It will, however, be understood that the fed strap enters the other part of the channel assembly, the movable channel or chute section, first and moves into the fixed portion only after passing through the movable section. Also, since the fixed channel portion is shown more clearly in Fig. 14 which illustrates the alternative form of strap channel assembly, that form will be described before the form appearing in the other drawings (Figs. 1, 2 and 3).

Referring to Figs. 5 and 14, it will be recalled that the table sections 66 are spaced somewhat from each other in alignment with the strap track 233 on the face 70 of the jaw housing 180. Between the spaced apart table sections 66 a plurality of small rollers 500 are mounted for rotation between fixed supporting plates 501, being separated therefrom by spacer strips 502. These rollers are arranged to define an upwardly and rearwardly extending arcuate fixed chute section 503. The plates 501 are secured between brackets 54 by bolts 509, as shown most clearly in Fig. 1. Hook-like strap keepers 504 are pivotally mounted between lugs 505 (Fig. 5) on the plates 501 which are biased by springs 506 to project into the strap channel 503, as at 507. These keepers direct the bundle encircling strap into the jaw assembly 24 but permit a pulling of the strap out of the channel 503 upon strap retraction. The washer strips 502 prohibit the strap passing through the line of rollers.

The movable strap chute section 508 is composed of two side members 510 which are curved through about 180 degrees and rigidly held in parallel spaced relation. Between the side members 510 are spaced rollers 512 similar to the rollers 500 in the fixed chute section 503. Spacer strips 511, similar to the strips 502, are also provided to prevent escape of strap, as previously mentioned. The base 514 of the movable chute section is aligned with the rollers 500 in the fixed chute section 503. The rollers 512 in the movable chute section 508 are spaced somewhat from the inner edges 513 of the side members 510. The movable chute section is pivotally mounted by pin 516 to ears 56. Forwardly of this pivot point 516 the rod end 518 of a pneumatic cylinder 520 is mounted to the chute 508 by pin 522 passing through the outer end of a projecting piston rod 519. The head end 524 of the cylinder 520 is secured to the inner plate 46. The cylinder is furnished with pressure ducts 526 selectively to deliver or relieve pressure in the head and rod ends thereof. These ducts are connected to a manually controlled four-way valve 528, shown diagrammatically which is connected in turn to a pressure manifold, not shown, by duct 530 and which may be attached to the carriage at any convenient point. When the movable chute section is in operating position so as to define a closed strap path, the upper free end 532 thereof lies immediately above a strap track extension 534 secured to the jaw assembly housing 180. It will be evident that admission of pressure to the rod end 518 of the cylinder 520 will move the movable chute section 508 to its operating position whereas admission of pressure to the head end 524 of the cylinder will swing the movable chute section forward and downward away from its operating position and leave the table open for the insertion or removable of a bundle.

As was stated before, a non-automatically operated movable chute section is intended primarily for use in a situation where it may be left in place throughout several strapping operations. The two types of chutes illustrated in Fig. 14 on the one hand and in Figs. 1, 2, and 3, on the other hand are equally well adapted for non-automatic and for integrated automatic operation. Since, however, the above described "front approach" type of chute is particularly suitable for strapping such bundles as coils of strip, it has been illustrated as operating under manual control.

The type of movable chute section illustrated in Figs. 1, 2, and 3 (i. e., the "top approach" type) has been devised primarily for horizontally introduced bundles such as coils of wire and the like. The strap channel 503 is substantially identical with the channel employed with the top opening chute, and the movable chute section 536 is likewise substantially similar, it consisting of a pair of plates 538 spaced apart by washer strips 539 and rotatable rollers 540 mounted therebetween which are spaced backward somewhat from the inner edges 541 of the plates. The chute extends arcuately from the front edge 542 of the table 58 to a point immediately above the top of the jaw housing 180. Since the end 543 of the chute adjacent the jaw housing 180 is the base end and hence the more securely fixed, a pocket 544 may be provided at the front edge of the table 58 for aligning the free end 545 of the chute with the fixed chute section. The movable chute section 536 is fixed at its base end 543 to an oscillatory arm 546 which extends generally laterally for a short distance and then downward to its mounting on the arch 36. The arm is mounted between ears 78 by a pin 548 for pivotal movement. The arched portion 36 of the frame carries two upstanding posts 550 and 552 located to the front and the rear respectively of the arm 546, as shown in Fig. 3. Over these posts compression springs 554 are placed and the upper part of the springs are enclosed by caps 556. The arm 546 carries a half skirt 558 above its point of pivotal attachment 548. This skirt 558 extends both to the front and to the rear over the spring supported caps 556. The springs 554 are selected to bear lightly on each end of the skirt 558 when the arm and chute assembly is at a point of substantial balance. Therefore, as the arm 546 tends to fall forward or to the rear, its fall is opposed by the appropriate spring.

The arm 546 extends downwardly below its point of pivotal mounting 548 and has connected to this lower part 560 the rod end 562 of a pneumatic cylinder 564. The head end 566 of this cylinder is connected to ears 80 on the arch 36, as clearly shown in Fig. 3. The cylinder is provided with pressure fittings 568 at its head and rod ends for admission or relief of pressure in the respective ends. Pressure applied to the head end 566 of the cylinder 564 will move the movable chute section 546 to its open or bundle receiving position, as indicated by dot-dash lines in Fig. 2. Conversely admission of pressure to the rod end 562 of the cylinder will advance the chute to its operating or closed position as shown in full lines in Fig. 2. The purpose served by the springs 554 and engaging skirt 558 is that the arm 546 and chute section 536 together are heavy, and the partial balancing of the weight of this assembly by the springs permits the use of a much smaller pneumatic cylinder.

A motor starting switch 569 is situated to be closed by lower part 560 of the arm 546 as it reaches its terminal rearward position; i. e., when the movable chute section is finally closed for strapping.

A shock absorber which is provided to counterbalance the head 22 and cushion the fall thereof following the cutting of the strap will now be explained with special reference to Fig. 15.

The inner side 570 of the sealer housing overlies a portion 572 of the carriage 10 and a vertical casing 574 for the shock absorber or counterbalance 576 is integrally formed thereon. The interior of the casing is threaded as at 577 over a central portion thereof and a dividing member 578 is threaded therein. The dividing member 578 separates the shock absorber into an upper reservoir part 579 and a lower part 580. The lower part is closed by a slidable hollow plunger 582. The plunger possesses an outstanding flange 584 and the casing an internal rib 586 which cooperate to prevent ejection of the plunger from the shock absorber. A compression spring 588 lies within the plunger 582 and bears against the head 589 thereof and against the dividing member 578. A packing gland 590 insures a liquidtight fit between the casing 574 and the plunger 582. The plunger walls 591 are perforated as at 592 below the flange 584 to permit the escape of any fluid that may find its way into the space 593 between the plunger wall 591 and the casing 574.

The dividing member 578 has formed therethrough a central threaded hole 594 and surrounding this hole a plurality of relatively large diameter ports 596. Threaded into the top of the hole 594 is a member 598 which provides a restricted flow aperture 600 for the hole 594. A second axially apertured member 602 terminating at its lower end in an outstanding flange 604 is threaded into the other end of the hole 594. A small compression spring 606 surrounds the lower exposed part of the threaded member 602 and bears at its lower end against the flange 604 and against a ring valve 608 which is adapted to close the ports 596. The upper end of the casing 574 is closed by a cap 610 which is fixed to the casing and by screws 611 and which contains a filler plug 612 for application of oil. A supply of oil is contained in the casing.

By virtue of the compression spring 588 the plunger 582 remains normally in contact with the carriage. As was stated before, the head 22 is fixed to the carriage for vertical pivotal movement. Therefore, as the head 22 is raised upward the plunger 582 remains in contact with the carriage by virtue of the relatively unrestricted flow possible through the ports 596. When, however, the head 22 is permitted to fall at the termination of the strapping cycle, the ring valve 608 closes the ports 596 and the return oil flow from the lower portion 580 to the reservoir portion 579 of the shock absorber can occur only through the restricted aperture 600 of the threaded member 598, thereby restricting the rate of fall of the head.

*The pneumatic system*

The pneumatic system is illustrated in diagrammatic form in Fig. 16. The machine normally will be supplied with air under appropriate pressure from any convenient source connected to the manifold 620. A duct 622 conveys air under pressure through a four-way solenoid operated valve 624 to the chute control cylinder 564. Ducts 621 and 623 admit or relieve pressure selectively in the head end 566 and rod end 562 of the chute control cylinder. The chute control cylinder 564 has a duct 626 leading from the head end 566 thereof to the head end 104 of the carriage positioning cylinder 98. The rod end 100 of the carriage positioning cylinder 98 and the gripping cylinder 110 are simultaneously either supplied with air pressure or exhausted by a three-way solenoid operated valve 630, the pressure being derived from manifold 620 through conduits 628, 627 and 629. Air is admitted to and exhausted from the head end of the sealing cylinder 112 by a conduit 632 which has interposed therein a three-way solenoid operated valve 634. The rod end of the sealing cylinder is connected by a branch conduit 636 to the conduit 626 between the chute control cylinder 564 and the carriage positioning cylinder 98.

Prior to initiating a strapping cycle in the machine the valve 624 is positioned to admit pressure air to the head end 566 of the chute control cylinder 564 through duct 621, thereby maintaining the chute in its open position. The head end 566 of the chute control cylinder likewise communicates air pressure by way of conduits 626 and 636 to the rod end of the sealing cylinder 112, thereby maintaining both the sealing and gripping pistons in their retracted position, and also communicates air pressure by conduit 626 to the head end 104 of the carriage positioning cylinder 98, to maintain the carriage 10 in its retracted position. In the cycle of operation, the solenoid of the valve 624 is first actuated to exhaust the head end of cylinder 564 and admit pressure to the rod end thereof, thereby closing the movable strap chute section 536. In this position valve 624 likewise permits an exhausting of the pressure in the rod end of the sealing cylinder 112 and in the head end of the carriage positioning cylinder 98.

Upon actuation of switch 569 by the closing movable chute section 536, strap is fed around the bundle until the switch 370 is actuated by the free end of the strap operating the finger 361, as previously explained, whereupon the valve 630 is opened to admit pressure to the gripping cylinder 110 and the rod end 100 of the carriage positioning cylinder 98 through conduits 627 and 628, thereby advancing the carriage 10 to its forward position and moving the jaws 24 to seize the free end of the strap and fold the seal about the overlapping strap portions. Upon the closing of switch 370 the motor 20 likewise is reversed as will be subsequently described and retraction of the strap commenced. After the strap has been tensioned, switch 470 is actuated, thereby energizing solenoid 812 and moving valve 634 to admit pressure through conduit 632 to the head end of the sealing cylinder 112. This advances the push rod 158 to form the joint and sever the strap.

Upon conclusion of the sealing operation all switches are deenergized as will be later described to return the several valves to their normal position of pressure application to the head end of the chute control 564, to the rod end of the sealing cylinder 112, and to the head end of the carriage positioning cylinder 98 and pressure relief or venting of the gripping cylinder 110 and the head end of the sealing cylinder 112 so to conclude the cycle.

The positioning of the strap reel 18 with respect to the idler roll 430 is controlled by the valve 390 which selectively admits the pressure from the conduit 640 connected to the manifold 620 to the head or rod end of the reel control cylinder 384 and exhausts the other end.

It will be understood that in the event the movable strap chute section is to be manually controlled, conduit 530 of valve 528 will be connected as shown in Fig. 14 to the manifold 620 and the valve 624 will be connected directly to conduit 626.

*Electrical circuit*

The electrical circuit is diagrammatically illustrated in Fig. 17. A conductor 700 connects a source of electrical power at 702 to a solenoid operated control relay 704. A normally open start switch 706, a normally closed stop switch 708 and a time delay relay controlled switch 710 are interposed in conductor 700. A conductor 712 having a normally open switch 714 of the relay 704 therein parallels the starting switch 706 to deliver power through a wire 716 to a terminal 718 to conductor 700 to hold the solenoid 719 of relay 704. Relay 704 also actuates a normally open switch 720 which is adapted to close the circuit from wire 712 to the solenoid 722 of the chute control valve 624.

Thus, as the starting switch 706 is closed, current flows through this switch, normally closed switches 708 and 710 and conductor 700 to energize the solenoid 719 which closes switches 714 and 720. The closure of switch 714 permits current to flow through conductors 712 and 716 to terminal 718 and thence through lead 700 to continue the energization of solenoid 719, thereby permitting a release of the start button. The closure of switch 720 energizes the solenoid 722 of the strap chute control valve 624 to move the chute to its closed position.

A conductor 724 is connected to terminal 718 and leads to a terminal 726 connecting with the single pole double throw strap feed control switch 370. The switch 370 is biased into engagement with contact 728 and movable in the manner set out before to contact 730. Contact 728 is connected to the feed field terminal 732 of the motor 20 by a conductor 734 in which are interposed the normally open chute operated switch 569 and a normally closed relay operated switch 736. It was pointed out before that terminal 718 was energized upon the closing of the start switch. Therefore as the chute moves to its operating position to close switch 569, power is delivered to the motor 20 through conductors 724 and 734 to drive the motor to feed out strap.

When the strap is passed completely around the strap path, the free end thereof moves the finger 361 to actuate the switch 370 to move it to contact 730. Contact 730 is connected to the single pole double throw tension switch 470 which is actuated by the compression of the spacing cylinder 458. The switch 470 is normally maintained in engagement with contact 738 but is movable to contact 740 upon compression of the cylinder 458. Contact 738 is connected to the rewind field terminal 742 of the motor 20 by a conductor 744 in which is a normally closed relay operated switch 746.

The terminal 730 likewise is connected to a terminal 748 by a conductor 750. The solenoid 752 of the gripping cylinder valve 630, the solenoid 754 of a relay 756, and one terminal of the switch 758 of the relay 756 are connected to terminal 748. The relay 756 includes, in addition to the normally closed switch 736 and the normally open switch 758, the normally open switches 760 and 762, and is operable upon energization to close switches 758, 760 and 762 and open switch 736. A conductor 764 is connected at one end to terminal 726 and at the other to one terminal of switch 762, the other terminal of switch 758, and one terminal of switch 766 of a relay 768.

It has been seen how the motor 20 is powered for feeding and that the terminal 726 is energized. When the proper amount of strap has been fed out, the switch 370 is moved to engage contact 730. This interrupts the flow of current to the feed terminal 732 of the motor and energizes the rewind terminal 742 through switch 470, contact 738, switch 746 and conductor 744. Simultaneously the gripping cylinder valve solenoid 752 and the solenoid 754 of relay 756 are energized, the former initiating a seizure of the free end of the strap and the latter closing switches 758, 760 and 762 and opening switch 736. Thereafter the solenoids 752 and 754 are energized through conductor 764 and the closed switch 758, the latter two elements constituting a holding circuit. The opening of switch 736 prevents a reenergization of the feed terminal 732 of the motor in the event of a return of switch 370 to contact 728.

The terminal 740 of switch 470 is connected to one terminal of the switch 760 by a conductor 770 in which is interposed a normally closed switch 772 of the relay 768. The other terminal of switch 760 is connected to the feed terminal 732 of the motor. A lead 774 also is connected to the feed terminal 732 which is connected to energize the solenoid 776 of a relay 778.

A conductor 780 extends from conductor 764 to one terminal of a normally open fourth switch 782 incorporated in relay 768. The relay 768 thus includes normally open switches 782 and 766 and normally closed switches 746 and 772. Energization, of course, will open switches 746 and 772 and close switches 766 and 782. The other terminal of switch 782 is connected to hold the solenoid 784 of relay 768 and also to a conductor 786 which is connected at its other end to one terminal of the normally open switch 788 of the relay 778. The other terminal of switch 788 is connected by conductor 790 to the other terminal of switch 762 of relay 756.

The other terminal of switch 766 is connected to a terminal 792 by a conductor 794 and to this terminal 792 the solenoid 796 of a time delay opening relay 798 is connected by lead 800. The solenoid 796 operates switch 710 and is of the type which, upon energization, lags a predetermined period before opening switch 710. The time interval required is determined by the time necessary to notch the seal and cut the strap.

A wire 802 also connected to terminal 792 leads to the solenoid 804 of a relay 806 which operates a normally open switch 808 in a conductor 810 leading from conductor 724 to solenoid 812 of the valve 634.

During the retraction and tensioning of the strap it will be remembered that the switch 470 rests on contact 738 and that solenoid 756 is energized. When the switch 470 is actuated by compression of the tension controlling and spacing cylinder 458, the connection is changed to contact 740 to deenergize the rewinding terminal of the motor and energize the feed terminal 732 through conductor 770 to reverse the motor. Energization of terminal 732 also energizes the relay 778 to close switch 788 through conductor 774. The closure of switch 788 permits current flow from conductor 764 through switch 762, conductor 790, switch 788 and conductor 786 to energize the relay 768. This opens switch 772 so breaking the circuit to the feed terminal of the motor. This momentary reversal of "plugging" of the motor serves to check as quickly as possible the tensioning rotation of the strap reel.

The closure of switch 782 permits current to flow from conductor 764 through conductor 780 to the solenoid 784 of relay 768 to constitute a holding circuit for the relay. The opening if switch 746 prevents a reenergization of the rewind terminal of the motor.

The closure of switch 766 energizes terminal 792 through conductors 764 and 794. From terminal 792 the time delay relay 798 is energized through conductor 800, the solenoid 804 of the relay 806 is energized through conductor 802. Energization of solenoid 806 closes switch 808 to admit current to the solenoid 812 of the valve 634 from conductor 724 through conductor 810. Energization of the former starts the time interval running, at the end of which switch 710 opens.

The opening of switch 710 breaks the circuit through conductors 712, 716 and 700 to the solenoid 719 of relay 704. This opens switch 714 which deenergizes the entire circuit. The severance of the strap returns switch 470 to its closed or starting (full line) position. Switch 370 is cleared to permit return during tensioning. The deenergization of solenoid 722 reverses valve 624 thereby opening the chute 536 to release switch 569.

Summary of operation

Before the commencement of a cycle of operation, the machine is withdrawn from its advanced position (e. g., away from the conveyor line) by pressure application to the head end 104 of the carriage positioning cylinder 98. Likewise the strap chute is open for the placement of the first bundle to be bound. Pressure also is admitted to the rod end 176 of the sealing cylinder 112 to position the jaw assembly 24 in its retracted position. A length of strap extends upward through the strap guide 428 such that the free end of the strap lies somewhat below the top edge of the cutter block 322 in inner groove 326 thereof. The seal ejector 228 is in its downward position and the ejector finger 238 holds a seal against the chair 284, the lower edge of the seal resting on the top edge of the notch 290 of the chair carrier 268. The strap interceptors 332 are projecting into the strap track 233 and the strap directors 349 are positioned in front of the jaws 24.

A bundle is now placed on the table 58 and the "start" switch 706 is closed.

When the start switch is closed, the relay 704 closes, energizing the solenoid 722 of the chute control valve 624 to admit pressure into the rod end of the chute control cylinder 564 to swing the movable chute section 536 to its bundle encircling position, i. e., that position where, the strap track 233, the fixed strap chute section 503, and the movable chute section 536 define a closed circular path about the bundle. At the same time actuation of valve 624 exhausts the rod end 176 of the sealing cylinder 112 and the head end 104 of carriage positioning cylinder 98. When the movable chute section reaches its closed position, it actuates chute switch 569 which closes the circuit to the feed windings of the motor 20 to cause the motor to commence rotating in the strap feeding or counterclockwise (Figures 2 and 16) direction. The idler roll 430 prevents any slip between the turns of the coil of strap and the free end of the strap is fed upward in front of the jaw assembly 24, between the interceptors 332 and the ejector block 228 and through the strap track 233 and extension 534 until it enters the strap chute section 536 (or 508). Thereafter the free end of the strap is pushed through the strap chute until, after encircling the bundle, it passes under the hook-like keepers 507, then into the outside groove 327 of the cutter block 322, and behind the inclined faces 352 of the directors 349, thereby being guided to a position closely in front of the jaw assembly 24. In the course of the travel of the free end of the strap up the outside groove 327 of the cutter block 322 it is diverted from a directly vertical travel by the finger 361, the spring loading of the finger being sufficient to prevent movement thereof at this time. Upon continuing feed, the end of the strap enters the flared lower end 367 of the strap track 233 which moves the strap to a directly vertical travel and, in so doing, causes the edgewise thrust of the strap to overcome the force of the spring 366 to move the finger 361 to actuate the switch 370. Upon movement of switch 370 from contact 728 to contact 730 the motor 20 is reversed; also solenoid 752 of valve 630 is energized whereby pressure is admitted into the head end 174 of the gripping cylinder 110. Simultaneously pressure is admitted to the rod end of the carriage positioning cylinder 98 to advance the carriage to bundle binding position.

In the course of the upward travel of the free end of the strap before the direction of the motor has had an opportunity to reverse, the free end of the strap meets the interceptors 332 which check the further upward movement of the free end of the strap. These interceptors are desirable because it is inevitable that there will be a certain amount of overrunning of the motor, after the operation of switch 370 has initiated its reversal, with a resultant tendency to feed too much strap. If the free end of the strap were seized when it is extended substantially more than necessary, two undesirable results would occur: First there would be substantial waste of strap. A second and more important result appears in the binding of low packages wherein the strap joint is formed near the top. If the free end is of such length that it would underlie the strap loop on the top surface of the bundle, it has been found that the subsequent tensioning drags the underlying end backward to wrinkle it. This effect would make tensioning more difficult, contribute to strap breakage and introduce a protruding hump in the strap loop. These objectionable results are prevented by the interceptors 332 which, because the strap path has an open straight front side between them and the adjacent end of the movable strap chute section, cause the standing portion of the strap momentarily to bow inwardly from that side sufficiently to compensate for the overrunning of the motor.

Admission of pressure to the gripping cylinder 110 advances the jaw assembly to cause the folding jaws 262 to fold a seal loosely about the now overlapping standing part and free end of the strap which project above the cutter block 322, and to cause the gripping jaws 266 to kink the free end of the strap sharply over the upper outside corner or shoulder 330 of the cutter block 322 to anchor it firmly (Fig. 7A). The seal should be initially folded loosely about the overlapping strap portions to enable the strap to be drawn therethrough during the tensioning operation. The cutter blade 270 is brought up to a position spaced slightly back from the inside groove 326 of the cutter block and the notcher 264 is brought forward to a position where the shearing surfaces, i. e., the forward edges of the notch 274, are spaced slightly to the rear of the folded seal and enclosed strap.

Simultaneously with this forward movement of the jaw assembly, the ejector is elevated by the push rod 158, 166 to a position above the seals in the magazine so that, upon subsequent descent, another seal will be delivered to the sealing jaws. Also interceptors 332 and directors 348 are removed from their respective positions in the path of the free end of the strap.

The direction of the motor having been reversed, the strap reel now moves in a clockwise direction to retract the strap and draw it tight around the bundle. The head 22 plays no part in the initial retraction other than anchoring the free end of the strap until the tension in the bundle encircling loop becomes sufficient to overcome the net weight of the head 22 as counter-balanced by the spring 588 in the shock absorber 576. Such resistance in effect halts the movement of the strap reel and in halting it imparts a counterclockwise rotation to the motor housing 380.

The linkage formed by the arm 452, carried by the motor housing, and the cylinder 458 thereupon delivers an upward thrust to the piston 454 of the tension controlling and spacing cylinder 458 which in turn transmits this thrust to the head 22 so as to pivot the head upward about the pin 120. The free end of the strap being firmly anchored in the head 22, the strap is thus drawn tight, not only by the pull of the motor in one direction but by the thrust of the spacing cylinder in the opposite direction. Thus the bundle encircling loop is tensioned about the bundle by a pull in opposite directions upon its two ends, insuring that the tensioning of the strap loop around bundle corners does not produce undesirable looseness.

It will be noted that when the spacing cylinder 458 transmits the thrust to the head to move it upward, the portion of the strap extending through the strap guide 428 from the top edge of the bundle to the strap reel is loaded by the tension desired to be obtained in the bundle encircling band plus the weight of the head which is substantial. In the event that light strap is being used, the addition of the head weight may cause the load to exceed the strength of the strap. Therefore the head is substantially counterbalanced by the spring 588 in the shock absorber 576. The counterbalancing of the head also insures a substantial equalization of the pull upon the two ends of the bundle encircling loop.

The motor continues to exert tensioning pull until the force of the spring 474 in the tension controlling and spacing cylinder 458 is overcome whereupon the piston 456 of the spacing cylinder is forced into that cylinder to move the bracket 468 upward with respect to the bottom of the spacing cylinder and so to actuate switch 470. The actuation of this switch 470 immediately reverses or "plugs" the motor for an instant so as to check as quickly as possible its strap retractive motion. At the same time the final movement of the jaw assembly 24 takes place to move the notcher 264 between the folding jaws 262 to notch the seal and enclosed strap in opposite sides at the longitudinal center of the seal and also to advance the cutter 270 across the inside groove 326 of the cutter block 322 to sever the standing portion of the strap from the tensioned and sealed bundle encircling strap loop. The advance of the notcher also squeezes the folded seal tightly about the overlapping ends of the strap loop to help produce a flat and strong joint.

The shock absorbing features of the shock absorber or counterbalance 576 and the spacing cylinder 458 are provided to accommodate two situations which arise upon the severing of the strap. Since the head 22 has been raised substantially by the tension imparted to the strap, the tendency, at the moment of severing, will be for the head to fall immediately and freely to the bottom of its travel. This would have the double effect of submitting both the motor and the head to undesirable shock, the motor tending to swing sharply about on its axis. This free fall of the head is prevented by the shock absorber 576. Also the release of tension consequent upon the severing of the standing part of the strap releases the tension in the spacing cylinder 458 and this likewise would occasion a sudden tendency of the motor housing to swing about its axis which is counteracted by the restraining action of the piston 456 of spacing cylinder 458. Upon strap severing, then, the head and the spacing cylinder 458 return slowly to normal condition.

As was pointed out in the electric diagram, the actuation of tension switch 470 energizes a time delay relay 798, the interval of which permits the notching and severing of the strap. After the expiration of the time interval, the switch 710 of this relay opens to deenergize the entire electrical circuit. Upon deenergization the pressure is reversed in the carriage positioning cylinder 98 to retract the carriage 10 from its advanced position. Pressure is applied to the rod end 176 of the sealing cylinder 112 and is exhausted in the head ends of the sealing cylinder and the gripping cylinder 110, which moves the push rod 158, 166 rearward, so drawing the jaw assembly into its retracted position. The rearward movement of the push rod 158, 166 likewise effects a return of the seal ejector 228 to its lower position, pushing before it the foremost seal from the seal magazine 196 and positioning the seal in front of the jaw assembly for the next strapping operation. The interceptors 332 and the directors 349 return to their positions in the strap track and in front of the jaws 24 and the pressure is reversed in the chute control cylinder 564 to move the movable chute section 536 to its bundle receiving or open position. The machine is now ready for the next binding operation which may be initiated by another closure of "start" switch 706.

Having thus described the nature and an embodiment of our invention, what we claim and desire to secure by Letters Patent of the United States is:

1. An automatic strapping machine comprising a frame; a reversible motor mounted on the frame for bodily rotation about the axis of its shaft; a reel mounted on the motor shaft for holding a coil of flexible metallic strap, the motor driving the reel in opposite directions, a strap being fed out upon the reel's rotation in one direction and being retracted and tensioned in the reel's rotation in the opposite direction; a strap guide for directing strap fed from the reel, during its feeding rotation, in a closed loop about a bundle with opposite ends of the loop in overlapping relation; movable anchoring means for anchoring one end of the strap loop against the retracting pull of the reel on the other end of the strap loop; and an operative connection between the motor and the movable anchor whereby bodily rotation of the motor tends to move the anchor to pull on the anchored end of the strap loop, the pull exerted by the reel and the pull exerted by the movable anchoring means tensioning the strap loop by pulls in opposite directions on the overlapping loop ends.

2. An automatic strapping machine comprising a frame; a reversible motor mounted on the frame for bodily rotation about the axis of its shaft; a reel mounted on the motor shaft for holding a coil of flexible metallic strap, the motor driving the reel in opposite directions, strap being fed out upon the reel's rotation in one direction and being retracted and tensioned in the reel's rotation in the opposite direction; a strap guide for directing strap fed from the reel, during its feeding rotation, in a closed loop about a bundle with opposite ends of the loop in overlapping relation; movable anchoring means for anchoring one end of the strap loop against the retracting pull of the reel on the other end of the strap loop; an operative connection between the motor and the movable anchor whereby bodily rotation of the motor tends to move the anchor to pull on the anchored end of the strap loop, the pull exerted by the reel and the pull exerted by the movable anchoring means tensioning the strap loop by pulls in opposite directions on the overlapping loop ends; sealing means operated by the motor for joining the overlapping ends of the tensioned strap loop, a cutter operated by the motor for severing the strap between the loop and the reel; and means for cushioning the return to normal position of both the motor and the movable anchor upon the severing of the strap and the release thereby of tension in the strap between the loop and reel.

3. An automatic strapping machine comprising a frame, a reversible motor mounted on the frame for bodily rotation about the axis of its shaft, a reel mounted on the motor shaft for holding a coil of flexible metallic strap, the motor driving the reel in opposite directions to feed strap from and retract strap to the reel as the motor rotates its shaft in one direction or the other, a strap guide for directing strap fed from the reel during its feeding rotation in a closed loop about a bundle with opposite ends of the loop in overlapping relation and one of the ends connected to the reel, movable anchoring means for anchoring one end of the strap loop against the retracting pull of the reel on the other end of the strap loop to exert a tensioning force on the reel connected end of the loop, a connection between the motor and the movable anchor whereby bodily rotation of the motor tends to move the anchor to pull on the anchored end of the strap loop to exert a tensioning force on the anchored end of the loop, and means substantially counterbalancing the weight of the anchoring means to insure approximate equality of the tensioning forces applied to the reel connected end and the anchored end of the loop.

4. A strap tensioning assembly for an automatic strapping machine wherein the strap is fed from a strap coil to encircle a package; comprising a support, a reel adapted to mount the strap coil, a motor connected to and adapted to drive said reel, a mounting pivotally attaching the motor to said support, movable means for gripping the free end of the strap, and a spacer operatively connected between said strap gripping means and said motor at a point spaced from the pivotal axis of the motor mounting to deliver a thrust to said strap gripping means upon resistance to the rotation of said strap reel.

5. A strap tensioning assembly for an automatic strapping machine wherein the strap is fed from a strap coil to encircle a package, the free end of the strap returning to overlap a standing portion thereof; comprising a support, a reel adapted to mount the strap coil, a motor connected to and adapted to drive said reel and pivotally mounted on and carried by said support, movable means for gripping the free end of the strap, and a spacer operatively connected between said strap gripping means and said motor at a point spaced from the pivotal axis of the motor mounting to deliver a thrust to said strap gripping means upon resistance to the rotation of said strap reel.

6. A strap tensioning assembly for an automatic strapping machine wherein the strap is fed from a strap coil to encircle a package; comprising a support, a reel adapted to mount the strap coil, a motor mounted for pivotal movement to said support and connected to and adapted to drive said reel, a member pivotally mounted at one end to said support and adapted at its other end to grip the free end ofthe strap, and a spacer operatively connected between said strap gripping means and said motor to deliver a thrust to said strap gripping means upon resistance to the rotation of said reel.

7. A strap tensioning assembly for an automatic strapping machine wherein the strap is fed from a strap coil to encircle a package; comprising a support, a reel adapted to mount the strap coil, a motor connected to and adapted to drive the strap reel, a pivotal mounting for attaching the motor to the support, movable means for gripping the free end of the strap, and a compressible spacer connected between said strap gripping means and said motor mounting at a point spaced from the pivotal axis of the motor mounting to deliver a thrust to said strap gripping means upon resistance to the rotation of said reel.

8. A strap tensioning assembly as claimed in claim 4 wherein the spacer includes movement restraining means to limit its rate of extension after the release of said thrust.

9. A strap tensioning assembly for an automatic strapping machine wherein strap is fed from a strap coil to encircle a package; comprising a carriage, a reel adapted to mount the strap coil, a motor connected to and adapted to drive said reel and mounted for rotation to said carriage, movable means for gripping the free end of the strap, a compressible spacer connected at one end to said motor at a point spaced from the axis of rotation thereof and at the other end to said strap gripping means to deliver a thrust to said strap gripping means upon resistance to the rotation of said reel, a switch situated to be actuated upon a predetermined shortening of said spacer cylinder, and circuit means including said switch for abruptly stopping said motor.

10. In an automatic strapping machine wherein strap is fed to encircle a bundle and which includes a frame; a strap tensioning assembly comprising means for anchoring the free end of the strap mounted on said frame to be moved upwardly therefrom to tension the strap, a linkage for supporting and moving said means by the application of tension to a portion of the strap, and means substantially counterbalancing the weight of the anchoring means.

11. In an automatic strapping machine, a frame, a rotatable strap reel, reversible means connected to the reel to drive it in one direction to feed strap to encircle a bundle with a standing portion of the strap extending between the bundle and the reel and to drive the reel in the reverse direction to draw the strap closely about the bundle, a strap tensioning assembly comprising means for grasping the free end of the strap mounted on said frame to be movable upward therefrom to tension the strap, a linkage for moving the grasping means upward upon resistance to the retraction of the standing portion of the strap by the reel wherein the elevated grasping means are supported by the standing portion of the strap, and means substantially counterbalancing the weight of said grasping means.

12. In an automatic strapping machine wherein strap is fed to encircle a bundle and which includes a carriage, a strap tensioning assembly comprising means for anchoring the free end of the strap mounted on said carriage to be movable upward therefrom to tension the strap, and means for retarding the fall of said anchoring means upon the release of the uplifting force.

13. In an automatic strapping machine of the type described, a strap anchoring assembly adapted to hold the free end of the strap against retraction, comprising a pair of jaws having hook-like forward extremities facing each other, said jaws being pivotally mounted for movement of said extremities toward each other with a rearward component of motion with respect to the machine to encompass the strap and move it rearward, and a member spaced closely below said jaws across the face of which the strap passes and having an edge over which the strap is adapted to be offset by said jaws.

14. In an automatic strapping machine of the type described, a strap anchoring assembly adapted to hold the free end of the strap against retraction including a pair of jaws adapted to grasp the edges of the strap and to move the strap transversely of its length toward said assembly, and a member providing an edge over which said jaws in transversely moving the strap are adapted to offset the strap.

15. In an automatic strapping machine of the type described, an anchoring assembly adapted to hold the free end of the strap against retraction comprising a member affording a surface across which the strap passes and which, at that side of the member remote from the direction of retraction terminates in an edge, and jaws situated closely adjacent said edge for offsetting the strap over said edge and toward said assembly.

16. In an automatic strapping machine of the type described, a strap feed control to determine the length of strap fed out, which machine includes means forming a strap path for guiding the strap to encircle a bundle; comprising a finger biased to extend into the path to deflect the fed strap from its line of travel, a switch adapted to be actuated by said finger to stop the feeding of the strap, and a portion of said path to receive the deflected strap to restore it to its line of travel to move said finger to actuate said switch.

17. In an automatic strapping machine of the type described which includes powered means for feeding out strap and means providing a strap path for guiding fed strap over a portion of its travel; a strap feed control to determine the length of strap fed, comprising a portion of said path adapted to deflect the strap laterally from its line of travel, and a switch adapted to be actuated upon lateral deflection of the strap to stop the feeding of the strap.

18. In an automatic strapping machine of the type described including powered means for feeding out strap, means forming a generally circular path to direct the strap to encircle a bundle, a switch to halt the feeding of strap, means for grasping the free end of the strap; and a strap feed control to prevent excess feed from the overrunning of the feeding means after switch actuation to halt the feeding means, comprising a barrier in the path forming means lying across the line of travel of the free end of the strap after bundle encirclement, means preventing movement of said barrier in the direction of strap travel, and said path forming means having an open flat portion situated on the side of the grasping means away from the barrier, from which the bundle encircling strap may bulge inwardly.

19. A strap feed control for an automatic strapping machine, which machine includes powered means for feeding out strap, and means forming a generally circular path for the fed strap to encircle a bundle, comprising a portion of said path forming means adapted to deflect the strap laterally from its line of travel, a switch to reverse the feeding means, a member situated to be moved by the deflection of the strap to actuate the switch, a barrier in the path forming means lying across the line of travel of the free end of the strap at the desired end point of strap feed, and said path forming means having an open flat portion situated on that side of the strap deflecting path portion and the switch operating members away from the barrier.

20. In an automatic strapping machine of the type described having means for feeding strap and means defining a path to direct the fed strap to encircle a bundle, the combination of an arm pivotally secured to the machine, a movable strap chute section mounted on said arm which defines a portion of said strap path and which is movable away from said path, means connected between said arm and the machine to move said arm to move the chute section between its position in the path and its position away from the path, said arm and said chute passing through a point of vertical balance in said movement, and means disposed to oppose resiliently the movement of said arm on either side of said point of balance.

21. An automatic strapping machine comprising means forming a storage receptacle for steel strap in long lengths, a strap feeding and retracting mechanism adapted to feed and retract strap when operated in one direction or the other respectively, track means adapted to direct strap fed by said feeding and retracting mechanism in a closed circuit to bring a free end of said strap into overlapping relation with the standing portion thereof to form a loop, strap gripping means including a member furnishing a shoulder and means adjacent the shoulder for offsetting the free end of the strap over said shoulder operating in conjunction with said feeding and retracting mechanism for tensioning the strap by gripping and pulling the free end of said strap in one direction of strap extension while said feeding and retracting mechanism pulls the standing portion thereof in the opposite direction, sealing means for forming a joint in the overlapped portion of the strap, and a strap cutter adapted to sever the standing portion of the strap from the loop at a point adjacent to said joint.

22. An automatic strapping machine for looping a length of flexible metallic binder about a bundle, tensioning the loop about the bundle and joining the ends of the tensioned loop, comprising means for feeding the binder to form a loop and for retracting the binder to tension the loop around the bundle, two relatively movable loop-path sections which supplement each other to provide a binder path encircling the bundle to be looped with binder to direct the fed binder to encircle the bundle, said loop-path sections being relatively movable to an open position to open the binder path for the reception and removal of a bundle and being relatively movable to a closed position to complete the binder path about the bundle, power means for producing the relative movement of said loop-path sections between their open and closed positions, a starting switch for said machine connected to operate said power means to close said sections upon actuation thereof, and a switch situated to be actuated by the closing of said sections connected to initiate the actuation of said means for feeding out binder to form the loop about the bundle.

23. An automatic strapping machine including a support, means for feeding out strap, means defining a strap path to direct the strap to encircle a bundle, said strap path defining means including a movable portion and a fixed portion, means for mounting said movable portion to said support for movement toward said fixed portion to define with the fixed portion a closed path and away from the fixed portion to open said path, power means for moving said movable portion between its open and closed position, a starting switch for said machine connected to operate said power means to close said movable portion upon actuation thereof, and a switch situated to be actuated by the closing of the movable portion connected to initiate the actuation of said means for feeding out strap.

24. A strap tensioning assembly for an automatic strapping machine wherein strap is fed from a strap coil into a strap loop to encircle a bundle and returned to the coil upon reverse rotation of the reel to tension the strap loop about the package; comprising a support, a reel adapted to mount the strap coil, a motor connected to and adapted to drive said reel, means mounting said motor to said support for rotation about an axis, movable means for gripping the free end of the strap, and a spacer operatively connected between said strap gripping means and said motor at a point spaced from said axis to deliver a thrust to said strap gripping means upon resistance to the retractive rotation of said strap reel.

25. A strap feeding and tensioning assembly for an automatic strapping machine wherein the strap is fed from a strap coil to encircle a package; comprising a support, a reel adapted to mount the strap coil, a reversible motor mounted for pivotal movement to said support and connected to and adapted to drive said reel, means to grip the free end of the strap after it has encircled the package, means actuated by the strap paid out from the strap coil to effect reversal of said motor, and means responsive to motor movement developed by resistance to rotation of said reel to stop the motor when the strap encircling the package has been sufficiently tensioned.

26. A strap feeding and tensioning assembly for an automatic strapping machine wherein the strap is fed from a strap coil to encircle a package; comprising a support, a reel adapted to mount the strap coil, a motor mounted for pivotal movement to said support and connected to and adapted to drive said reel, means to grip the free end of the strap after it has encircled the package, and means responsive to motor movement developed by resistance to rotation of said reel to stop the motor when the strap encircling the package has been sufficiently tensioned.

27. A strap feeding and tensioning assembly for an automatic strapping machine wherein the strap is fed from a strap coil to encircle a package; comprising a support, a reel adapted to mount the strap coil, a motor mounted for pivotal movement to said support and connected to and adapted to drive said reel, means to grip the free end of the strap after it has encircled the package, and means operated by motor movement developed by resistance to rotation of said reel to limit the tension in the strap encircling the package.

28. A strap feeding and tensioning assembly for an automatic strapping machine wherein the strap is fed from a strap coil to encircle a package; comprising a support, a reel adapted to mount the strap coil, a motor mounted for pivotal movement to said support and connected to and adapted to drive said reel, means to grip the free end of the strap after it has encircled the package, compressible means operated by motor movement developed by resistance to rotation of said reel to limit the tension in the strap encircling the package, and means responsive to the motor movement to stop the motor when the strap tension limit has been reached.

29. In an automatic strapping machine of the type described which includes powered means for feeding out strap and means for guiding the strap fed over a portion of its travel; a strap feed control to determine the length of strap fed, comprising a switch adapted to stop feeding of the strap when actuated, a movable switch actuating means connected to actuate said switch, and means engageable by the moving strap to cause the strap to be displaced from its original travel path and to move said switch actuating means.

30. In an automatic strapping machine of the type described which includes powered means for feeding out strap and means for guiding the strap fed over a portion of its travel; a strap feed control to determine the length of strap fed, comprising a switch adapted to stop feeding of the strap when actuated, a movable switch actuating means connected to actuate said switch, and means engageable by the moving strap to cause the strap to move from its original travel path and to move said switch actuating means.

References Cited in the file of this patent

UNITED STATES PATENTS

| | | |
|---|---|---|
| 605,928 | Chuster | June 21, 1898 |
| 1,003,791 | Prickett | Sept. 19, 1911 |
| 1,654,844 | McChesney | Nov. 29, 1927 |
| 1,654,651 | Johnson | Jan. 3, 1928 |
| 2,136,225 | Williams | Nov. 8, 1938 |
| 2,194,108 | Wright | Mar. 19, 1940 |
| 2,285,120 | Marchev | June 2, 1942 |
| 2,231,818 | Wallace | Oct. 12, 1943 |
| 2,409,652 | Workman | Oct. 22, 1946 |
| 2,523,571 | Humm | Sept. 26, 1950 |
| 2,563,198 | Thalhammer | Aug. 7, 1951 |
| 2,597,675 | Sackett | May 20, 1952 |

FOREIGN PATENTS

| | | |
|---|---|---|
| 868,766 | France | Jan. 15, 1942 |